United States Patent
Aoki et al.

[11] Patent Number: 5,892,948
[45] Date of Patent: Apr. 6, 1999

[54] PROGRAMMING SUPPORT APPARATUS AND METHOD

[75] Inventors: Ryuichi Aoki; Yasushi Ishikawa; Makoto Muramatsu; Shinichiro Yamamoto, all of Kanagawa, Japan

[73] Assignee: Fuji Xerox Co., Ltd., Tokyo, Japan

[21] Appl. No.: 801,669

[22] Filed: Feb. 18, 1997

[30] Foreign Application Priority Data

Feb. 19, 1996 [JP] Japan ..................................... 8-030569
Feb. 20, 1996 [JP] Japan ..................................... 8-032520

[51] Int. Cl.$^6$ ........................................................ G06F 9/45
[52] U.S. Cl. ............................................................. 395/701
[58] Field of Search ............................ 395/701; 345/356, 345/357, 339

[56] References Cited

U.S. PATENT DOCUMENTS 5,313,575  5/1994  Beethe ..................................... 395/159

FOREIGN PATENT DOCUMENTS

A-6-12250   1/1994  Japan .
A-7-56725   3/1995  Japan .
A-7-191840  7/1995  Japan .

OTHER PUBLICATIONS

M. Hirakawa, Y. Nishimura, M. Kado, and T. Ichikawa, "Interpretation of Icon Overlapping in Iconic Programming", IEEE pp. 254–259, 1991.

Tadao Ichikawa and Masahito Hirakawa, "Iconic Programming: Where to go?", IEEE pp. 63–68, Nov. 1990.

*Primary Examiner*—Tariq R. Hafiz
*Assistant Examiner*—Lisa Stevens
*Attorney, Agent, or Firm*—Finnegan, Henderson, Farabow, Garrett & Dunner, L.L.P.

[57] ABSTRACT

An execution control section specifies a function object to next be executed on the basis of icon layout information. When there is a second icon is adjoining or adjacent to the right side or the lower side of a first icon, the execution control section applies an output of the function corresponding to the first icon to the function of the second icon, to trigger the function of the second icon. Icon layout information can be formed by merely juxtaposing icons. The execution control section successively executes the functions of the icons in an order in which the icons are juxtaposed. Also, when an icon is operated, a window management system generates an event. In accordance with the event, an operation environment control portion executes and displays an object corresponding to the icon. A program is composed from function objects corresponding to icons laid out. An interpreter of an execution control section receives an execution instruction to be given to a program, and successively executes the function objects by utilizing icon layout information. A process management portion successively executes function objects.

33 Claims, 24 Drawing Sheets

SIMILAR EFFECTS TO DROP AND DRAG

PROGRAMMING SUPPORT APPARATUS AND METHOD

BACKGROUND OF THE INVENTION

The present invention relates to a programming support apparatus and method which graphically displays functions by using such a graphical symbol as an icon, and do programming and processes information through operations of icons, for example. More particularly, the invention relates to a technique which can control a flow of information processings on the basis of layout information of icons, for example. Also, the invention relates to a technique which enables a user to easily do programming by utilizing an operational environment where the user can interactively execute functions or operations to data.

When a person who needs a program directly develops his desired program, he can develop a program that satisfies his necessity or intention and its development is quick. However, development of a program is very difficult for a general user who is not professional in programming. Therefore, it is desired to provide for those general user such an operation environment that a new function is generated through operations similar to programming, viz., by combining known functions.

A technique to combine known functions to generate a new ability in a system is known. In the technique, graphical elements as visualized functions are interconnected by connection lines. However, the technique is disadvantageous in that an element-to-element connecting work of the graphical elements is troublesome, and a display has frequently a complicated effect since graphics and connection lines as well are displayed.

In this respect, it is desired that the functions may be combined in a simple manner, and that the display is neat and easy to see.

A situation that a process desired by a user is too large to display it by one flow of processings frequently occurs. For example, a plural number of processing results are frequently combined to carry out another process. It is desired that when a plural number of processing flows are combined, the user can cope with such a situation by merely combining the functions, and that the course of a process execution is clearly presented to the user.

It is desirable to control a flow of processings such that a function composed anew is directly executed by an instruction by the user, and further is automatically started under a predetermined condition, for example, after a preset time elapses or the function is repeatedly executed till the predetermined condition is satisfied.

In the present computer system, a so-called operational environment is provided for a user. In the environment, the user can directly operate individual functions and data, and can interactively process the functions and data. An example of the operational environment is the file manager of Windows 3.1 (trade mark by Microsoft Inc. in U.S.A.). In the environment, the user can specify a function and causes a computer to execute the function through an interactive operation (a double clicking process, viz., double clicking of the button of a mouse device). Further, the user directly specifies data and causes the computer to display the data.

In the operational environment, the objects to be operated are merely individual function and data. When a plural number of functions are successively executed for one data, it is necessary to execute the functions one by one. It is very convenient if necessary functions could be executed in a batch processing manner. The functions ordinarily executed can be executed more simply if the following technical approach is realized: the functions ordinarily executed are analyzed by utilizing the operational environment, the functions that can successively be executed are selectively gathered, and those gathered functions are automatically executed.

If the above technical approach is realized, a user who needs a program can directly compose a program as desired and intended, and its development is quick.

The conventional techniques relating to the present invention are, for example, Japanese Patent Unexamined Publication Nos. (1) Hei. 7-56725, (2) Hei. 7-191840 and (3) Hei. 6-12250. The publication (1) discloses a programming support method which defines input/output relationships by connecting information processing parts as visualized functions with arrows. The publication (2) discloses an automatic program composer which connects graphical symbols of program modules as visualized functions with lines indicative of data flows. The publication (3) discloses a visual programming method which connects icons of object parts as visualized functions with connecting lines indicative of message communication.

SUMMARY OF THE INVENTION

The present invention has been made in view of the above circumstances and has a first object to provide a programming support apparatus and method in which a new function can be composed from function objects in a simple manner without a connection work to interconnect functions, such graphical symbols as program modules, and an expression of the combination of the function objects is explicit and easy to comprehend and to handle.

A second object of the present invention is to provide a programming support apparatus and method in which a plural number of functions are successively executed in a batch processing manner in an operational environment, whereby programming can be done by effectively utilizing individual functions in the operational environment.

To achieve the above first object, there is provided a programming support apparatus comprising: display means for displaying functions in the form of display objects on a display screen area; judging means for recognizing a plural number of display objects, which are arrayed in one or more number of directions while being in contact with or spaced from each other a preset distance or shorter, and for judging an arraying order of the display objects arrayed in one or more number of directions; and executing means for executing the functions corresponding to the plural number of display objects in the arraying order of the display objects.

With such an arrangement, by merely juxtaposing display objects as the visual representation of function objects, the user can simultaneously specify a function to be executed and set an execution order. Accordingly, there is no need of displaying line segments to specify an execution order. In this respect, the operability is improved. Further, a flow of execution is explicitly displayed, and easy to comprehend and to handle since the line segments are not displayed.

In the programming support apparatus, the display object may be rectangular in shape.

When the information to be processed are correlated with the display objects, the executing means may execute a function corresponding to the display object correlated therewith for the information to be processed.

The programming support apparatus may be arranged such that executing means generates a process for every information to be processed, and executes a plural number of functions in the arraying order in which the generated processes are executed.

The programming support apparatus may be arranged such that the functions corresponding to at least some of the display objects store information.

The programming support apparatus may be arranged such that when a predetermined display object is in contact with or spaced a preset distance or shorter from other display objects arrayed upstream of the predetermined display object in a plural number of directions, the executing means executes the function corresponding to the predetermined display object for the outputs of the functions corresponding to the other display objects.

The programming support apparatus may be arranged such that when a predetermined display object is in contact with or spaced a preset distance or shorter from other display objects arrayed upstream of the predetermined display object in a plural number of directions, the executing means executes one of the functions corresponding to the other display objects for the function corresponding to the predetermined display object.

The programming support apparatus may be arranged such that the functions corresponding to the other display objects are executed in their own orders for the output of the function corresponding to the predetermined display object, and after the execution of the preceding functions corresponding to the other display objects and the functions correlated thereto for the output is completed, the execution of the subsequent functions corresponding to the other display objects and the functions correlated thereto for the output starts.

The programming support apparatus may be arranged such that the functions corresponding to the other display objects are correspondingly executed for a plural number of the outputs of the function corresponding to the predetermined display object, respectively.

The programming support apparatus may be arranged such that the function corresponding to the predetermined display object outputs memory location data to specify a memory location where information to be processed is stored, and the functions corresponding to the other display objects are executed for the information stored in the memory location in a predetermined order on the basis of the memory location data.

The programming support apparatus may further comprise: setting means for setting a trigger condition; storage means for storing a trigger condition set by the setting means; display means for displaying a trigger display object representative of a trigger condition; and trigger control means operating such that when an instruction to start the monitoring of a trigger condition is issued, the trigger control means monitors the trigger condition, and when the trigger condition is satisfied, the trigger control means sends an instruction to execute a triggering process to the executing means.

The programming support apparatus may be arranged such that when the trigger display object is located upstream of the predetermined display object in a state that the trigger display object is in contact with or spaced a preset distance or shorter from the predetermined display object in the predetermined direction or the plural number of directions, and when a trigger condition corresponding to the trigger display object is satisfied, the trigger control means sends an instruction to trigger the function corresponding to the predetermined display object to the executing means.

The programming support apparatus may be arranged such that when the trigger display object is in contact with or spaced a preset distance or shorter from two display objects in the predetermined direction or the plural number of directions, and when a trigger condition corresponding to the trigger display object is satisfied, the trigger control means sends to the executing means an instruction to input an output of the function corresponding to the upstream display object to the function corresponding to the downstream display object.

The programming support apparatus may be arranged such that the trigger control means stores an environment condition when an instruction to start the monitoring of a trigger condition is issued, and after an event to alter the environment condition occurs, the trigger control means monitors the trigger condition only when an environment condition at the time of execution satisfies the stored environment condition, and sends the instruction.

The programming support apparatus may further comprise: means for specifying two functions to be successively executed; means for displaying line segments for the two functions to be successively executed; and means for specifying an execution start time difference for each line segment; wherein the trigger control means sends the instruction in accordance with the time difference.

The programming support apparatus may be arranged such that between first and second predetermined display objects, a plural number of display objects are linearly arrayed in the predetermined direction or the plural number of directions, while being in contact with each other or spaced a preset distance or shorter from each other, and when the execution of the function or functions related to the one display object or the plural number of display objects fails to produce an expected result, the trigger control means sends to the executing means an instruction to execute the function related to a display object being in contact with the first display object while being located downstream of the first display object.

The programming support apparatus may further comprise means for displaying information to be processed in the form of a display object, wherein when the trigger display object is in contact with or spaced a preset distance or shorter from an upstream display object of information to be processed and a downstream display object of the function in the predetermined direction or the plural number of directions, and when a trigger condition corresponding to the trigger display object is satisfied, the trigger control means sends to the executing means an instruction to input the information to be processed to the function.

According to another aspect of the present invention, there is provided a programming support method comprising the steps of: displaying functions in the form of display objects on a display screen area; recognizing a plural number of display objects, which are arrayed in one or more number of directions while being in contact with or spaced from each other a preset distance or shorter, and for judging an arraying order of the display objects arrayed in one or more number of directions; and executing the functions corresponding to the plural number of display objects in the arraying order of the display objects.

According to a still another aspect of the invention, there is provided a computer-readable medium encoded with a programming support program, said medium causing a computer to execute the following steps of displaying functions in the form of display objects on a display screen area; recognizing a plural number of display objects, which are arrayed in one or more number of directions while being in contact with or spaced from each other a preset distance or shorter, and for judging an arraying order of the display objects arrayed in one or more number of directions; and executing the functions corresponding to the plural number of display objects in the arraying order of the display objects.

According to a further aspect of the invention, there is provided an information processing display comprising: display means for displaying functions in the form of display objects on a display screen area; judging means for recognizing a plural number of display objects, which are arrayed in one or more number of directions while being in contact with or spaced from each other a preset distance or shorter, and for judging an arraying order of the display objects arrayed in one or more number of directions; and executing means for executing the functions corresponding to the plural number of display objects in the arraying order of the display objects.

Further, to achieve the above second object, there is provided a programming support apparatus comprising: display means for displaying functions and data as display objects on a display screen area; means for executing, in response to a first operation done to the display object on the display screen, corresponding functions and for displaying corresponding data; first means for doing a second operation to a plural number of display objects corresponding to a plural number of functions on the display screen, to thereby specify an order to execute the plural number of functions; second means for specifying, in response to a third operation done to the display object on the display screen area, data to be executed of the plural number of functions; and executing means for successively executing the plural number of functions for the specified data in the specified executing order.

With such an arrangement, individual functions may be combined and successively executed in an environment where individual functions are executed by operations on the display screen area. An ordinary work can easily be executed.

Further, according to the invention, there is provided a programming support apparatus comprising: display means for displaying functions and data as display objects on a display screen area; means for executing, in response to a first operation done to the display object on the display screen area, corresponding functions and for displaying corresponding data; first means for doing a second operation to a plural number of display objects corresponding to a plural number of functions on the display screen area, to thereby specify an order to execute the plural number of functions; second means for specifying one of display objects corresponding to the plural number of functions as an execution start point; and executing means for executing, in the execution order, the function corresponding to the display object designated as the start point and the functions located in the execution order.

With such an arrangement, where a series of functions are handled as one execution unit, it is possible to execute only some of the functions.

In the programming support apparatus thus arranged, when or after one function is executed, a function to next be executed may be determined.

Accordingly, it is possible to stop the execution for those functions not yet executed, or alter the whole process.

In the programming support apparatus thus arranged, the executing means displays an error on the display screen area in connection with a display object corresponding to a function suffering from an error.

In response to a fourth operation done to the error display on the display screen area, data to be processed by the function suffering from an error is displayed.

Further, data displayed in response to the fourth operation is edited.

Still further, according to the invention, there is provided a programming support method comprising the steps of: displaying functions and data as display objects on a display screen area; executing, in response to a first operation done to the display object on the display screen area, corresponding functions and for displaying corresponding data; doing a second operation to a plural number of display objects corresponding to a plural number of functions on the display screen area, to thereby specify an order to execute the plural number of functions; specifying, in response to a third operation done to the display object on the display screen area, data to be executed of the plural number of functions; and successively executing the plural number of functions for the specified data in the specified executing order.

Still further, according to the invention, there is provided a computer-readable medium encoded with a programming support program, said medium causing a computer to execute the following steps of: displaying functions and data as display objects on a display screen area; executing, in response to a first operation done to the display object on the display screen area, corresponding functions and for displaying corresponding data; doing a second operation to a plural number of display objects corresponding to a plural number of functions on the display screen area, to thereby specify an order to execute the plural number of functions; specifying, in response to a third operation done to the display object on the display screen area, data to be executed of the plural number of functions; and successively executing the plural number of functions for the specified data in the specified executing order.

Still further, according to the invention, there is provided an information processing apparatus comprising: display means for displaying functions and data as display objects on a display screen area; means for executing, in response to a first operation done to the display object on the display screen, corresponding functions and for displaying corresponding data; first means for doing a second operation to a plural number of display objects corresponding to a plural number of functions on the display screen, to thereby specify an order to execute the plural number of functions; second means for specifying, in response to a third operation done to the display object on the display screen area, data to be executed of the plural number of functions; and executing means for successively executing the plural number of functions for the specified data in the specified executing order.

BRIEF DESCRIPTION OF THE INVENTION

FIG. 1 is a diagram of an environment into which a programming support apparatus according to the present invention is installed.

FIGS. 2(A) to 2(C) are diagrams useful in explaining icons used in the invention;

FIGS. 6(A) to 6(E) are diagrams useful in explaining how to execute a program composed by the basic programming technique.

Figure 7:
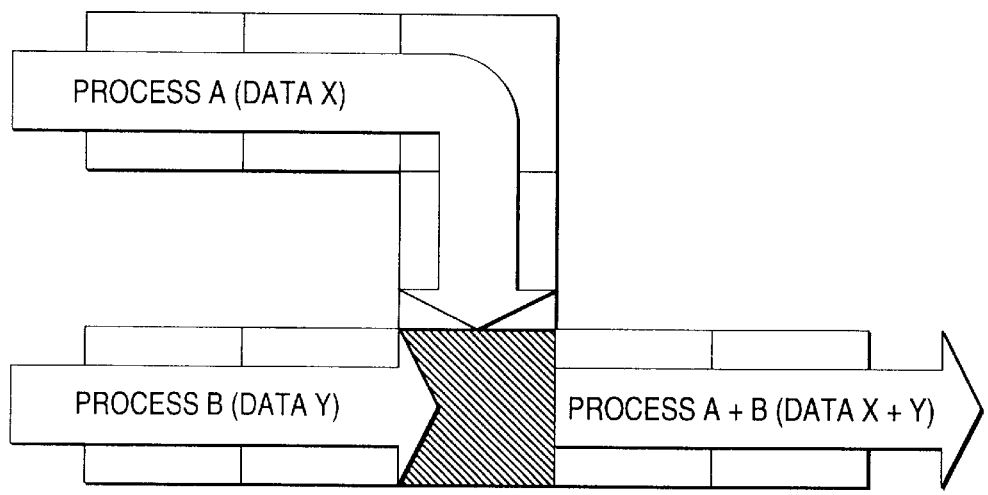

FIG. 7 is a diagram useful in explaining a joining programming in the first embodiment.

Figure 8:
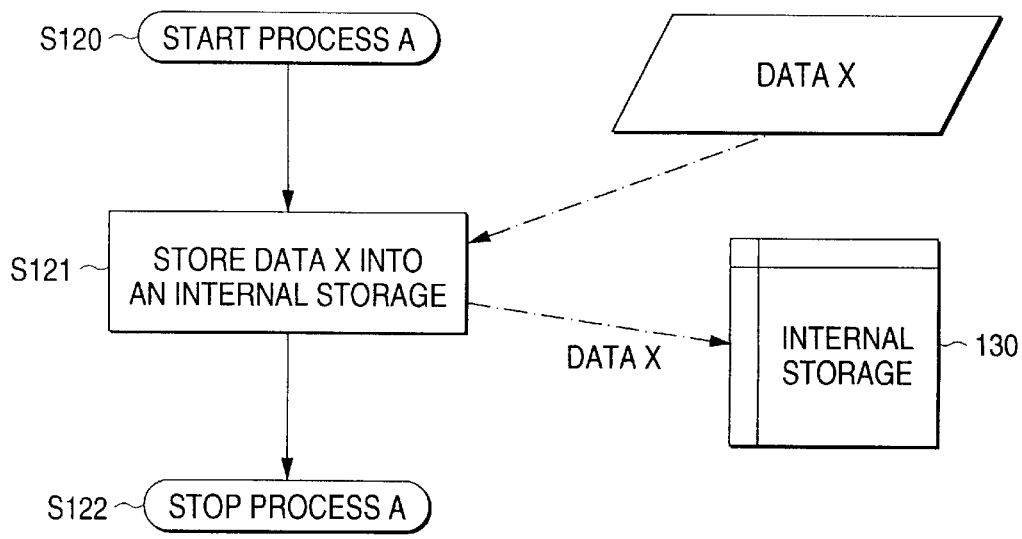

FIG. 8 is a flow chart showing an execution of a function composed by the joining programming technique of FIG. 7.

Figure 9:
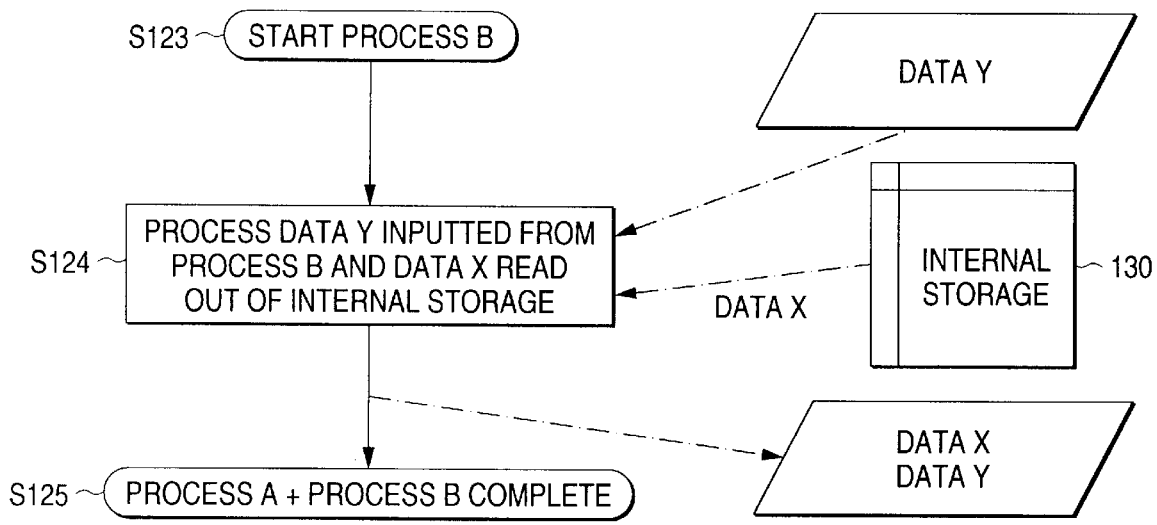

FIG. 9 is another flow chart showing an execution of a function composed by the joining programming technique of FIG. 7.

Figure 10:
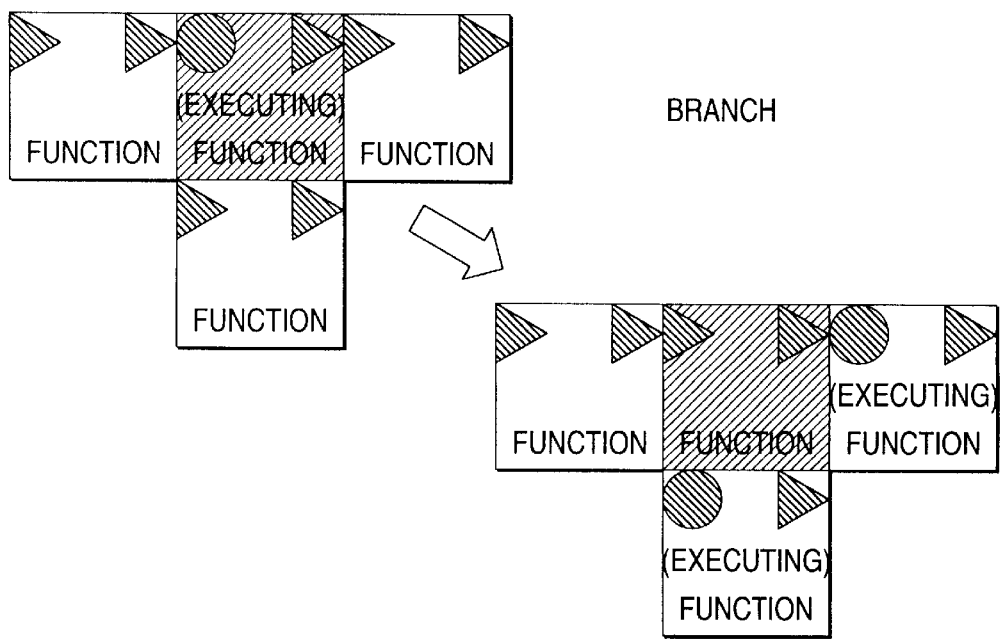

FIG. 10 is a diagram for explaining a branching programming technique in the first embodiment.

Figure 11:
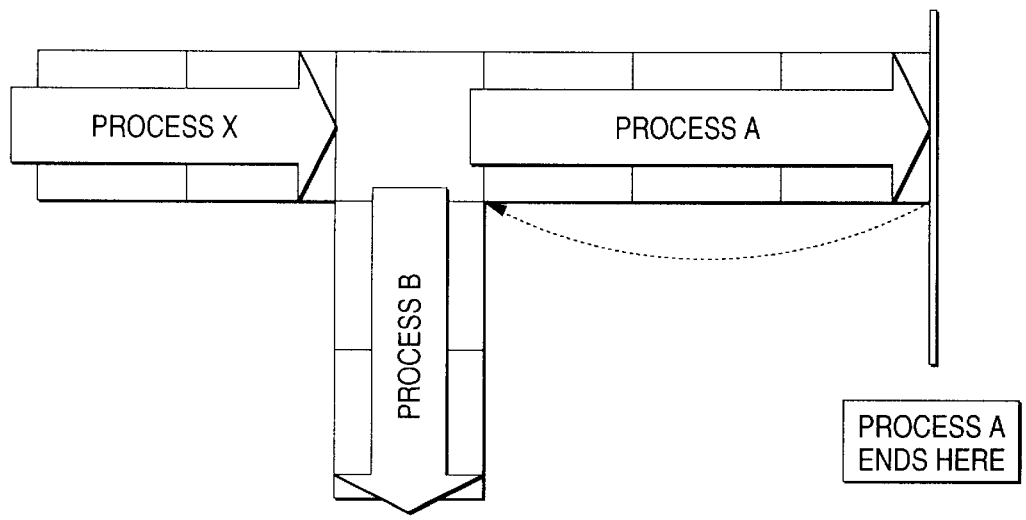

FIG. 11 is a diagram showing an execution of a function composed by the branching programming technique of FIG. 10.

Figure 12:
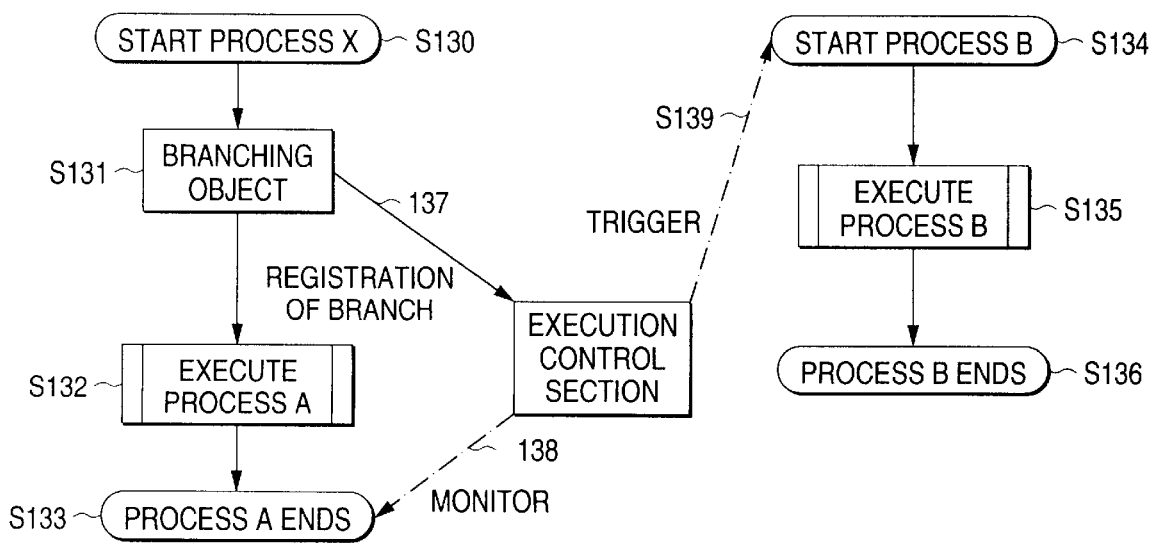

FIG. 12 is a flow chart showing an execution of a function composed by the branching programming technique of FIG. 10.

FIGS. 13(A) and 13(B) are diagrams showing characteristics of a second embodiment of the present invention.

Figure 14:
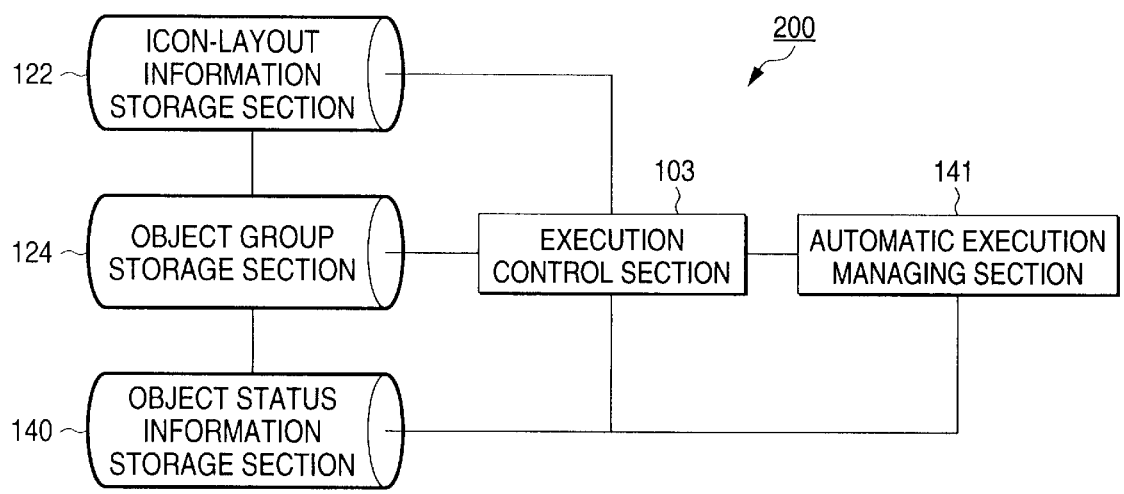

FIG. 14 is a functional block diagram showing an overall arrangement of the second embodiment.

Figure 15:
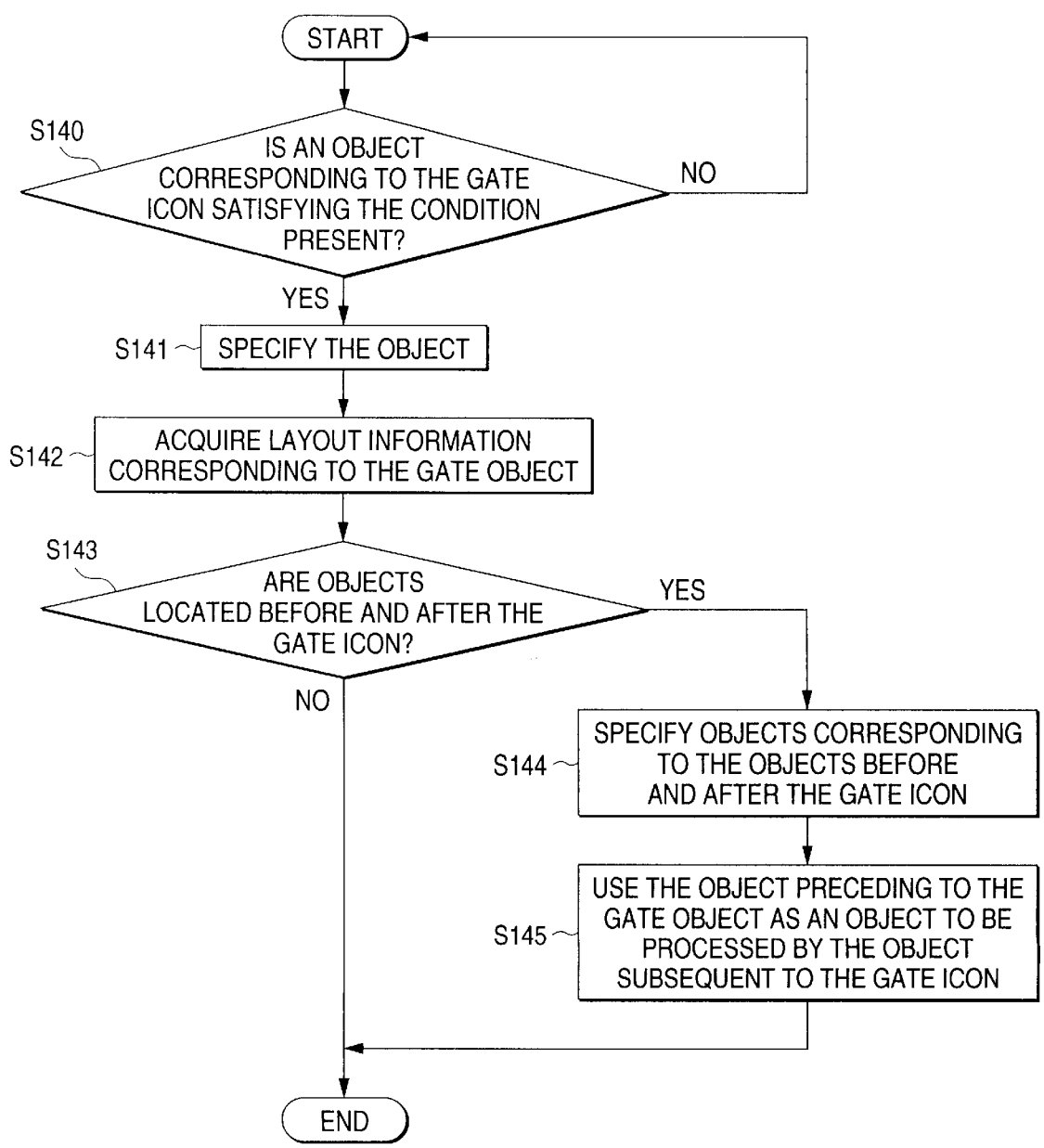

FIG. 15 is a flow chart showing an operation of executing a function composed by a basic programming technique in the second embodiment.

Figure 16:
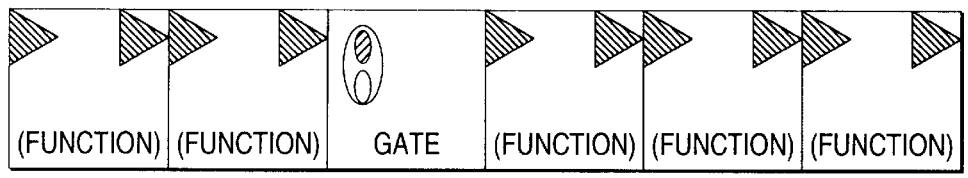

FIG. 16 is a diagram for explaining an example of the automatic execution control using a gate icon located between the function icons in the second embodiment.

Figure 17:
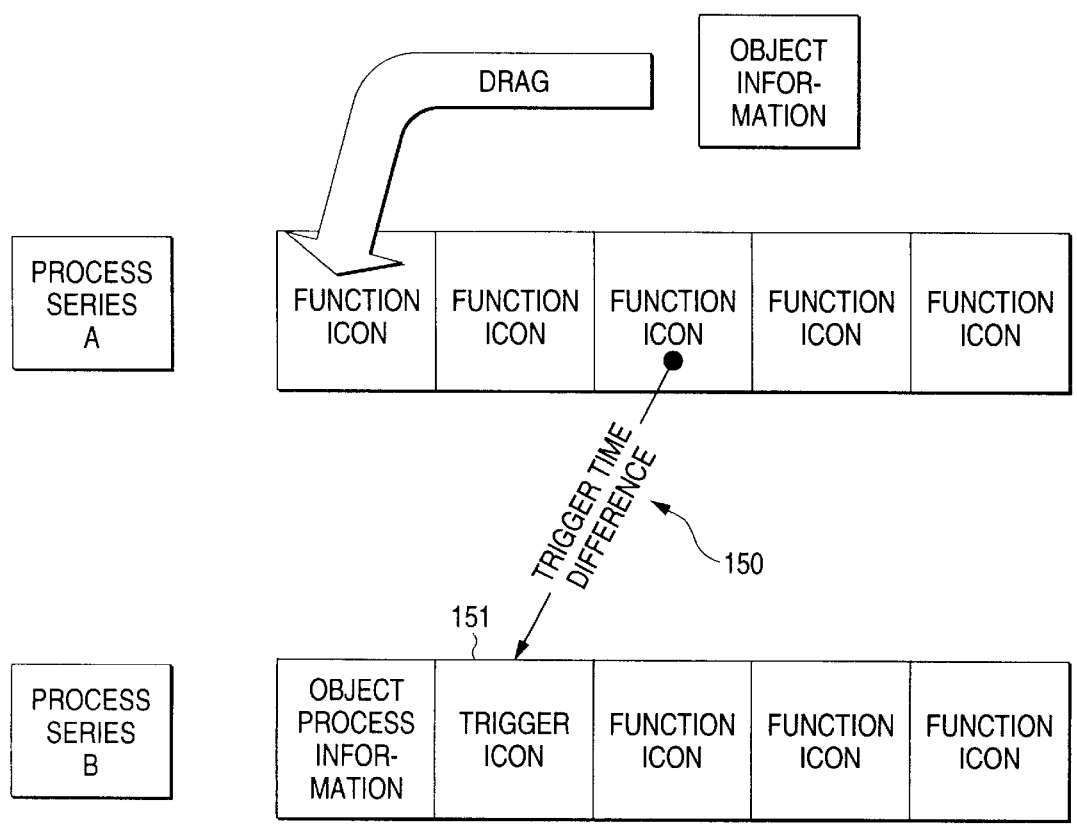

FIG. 17 is a diagram showing an example of the automatic execution control using a trigger line in the second embodiment.

Figure 18:
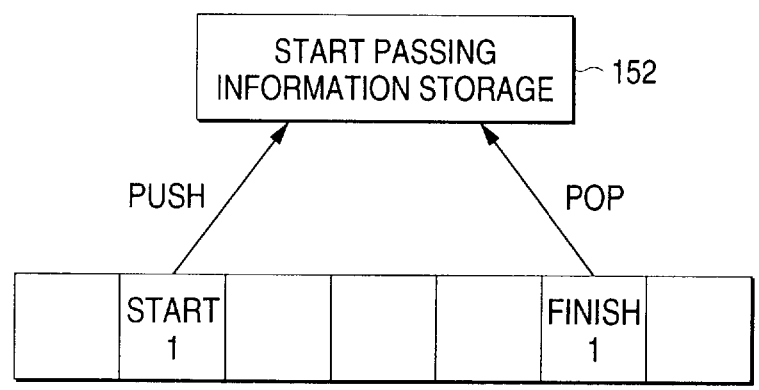

FIG. 18 is a diagram showing an example of the automatic execution control using a start icon and a finish icon in the second embodiment.

Figure 19:
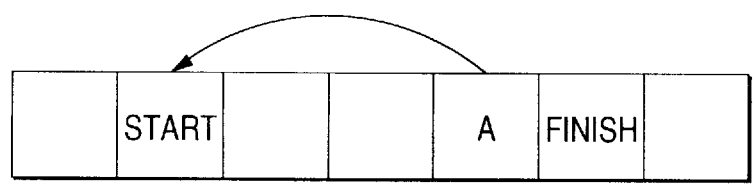

FIG. 19 is a diagram for explaining the start/finish icon basis automatic execution control of FIG. 18.

Figure 20:
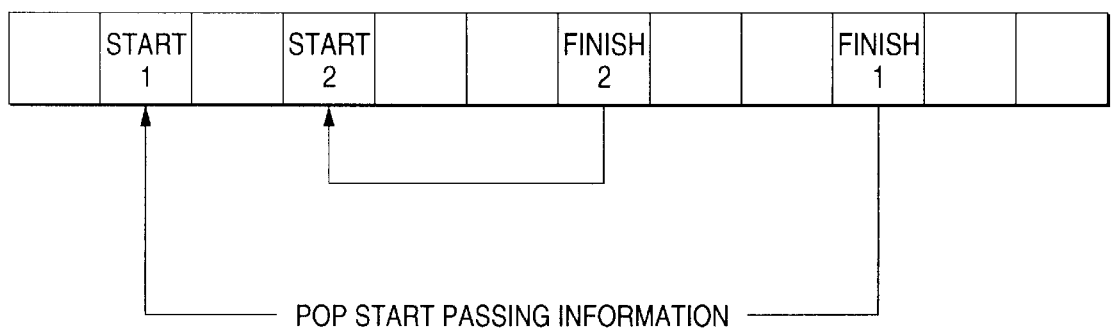

FIG. 20 is another diagram for explaining the start/finish icon basis automatic execution control of FIG. 18.

Figure 21:
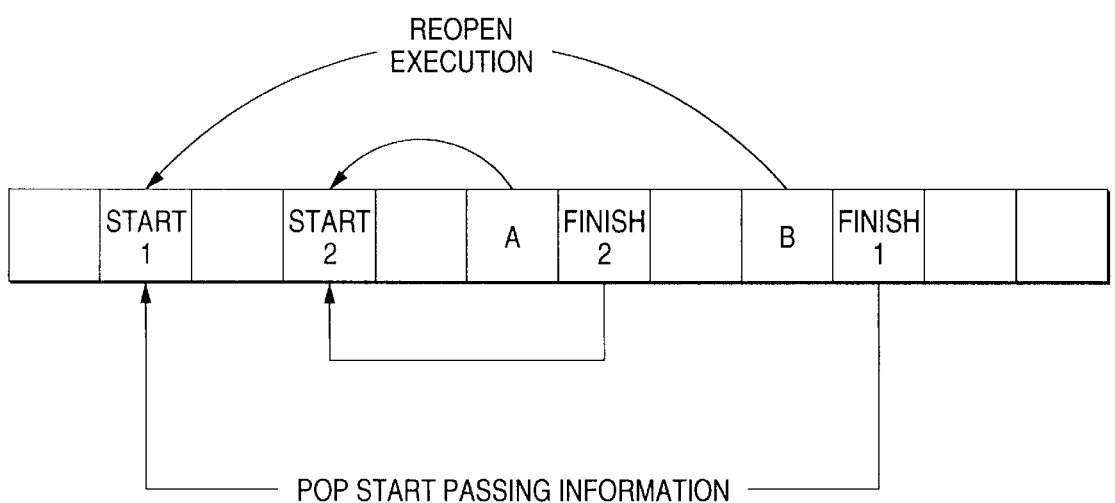

FIG. 21 is a still another diagram for explaining the start/finish icon basis automatic execution control of FIG. 18.

Figure 22:
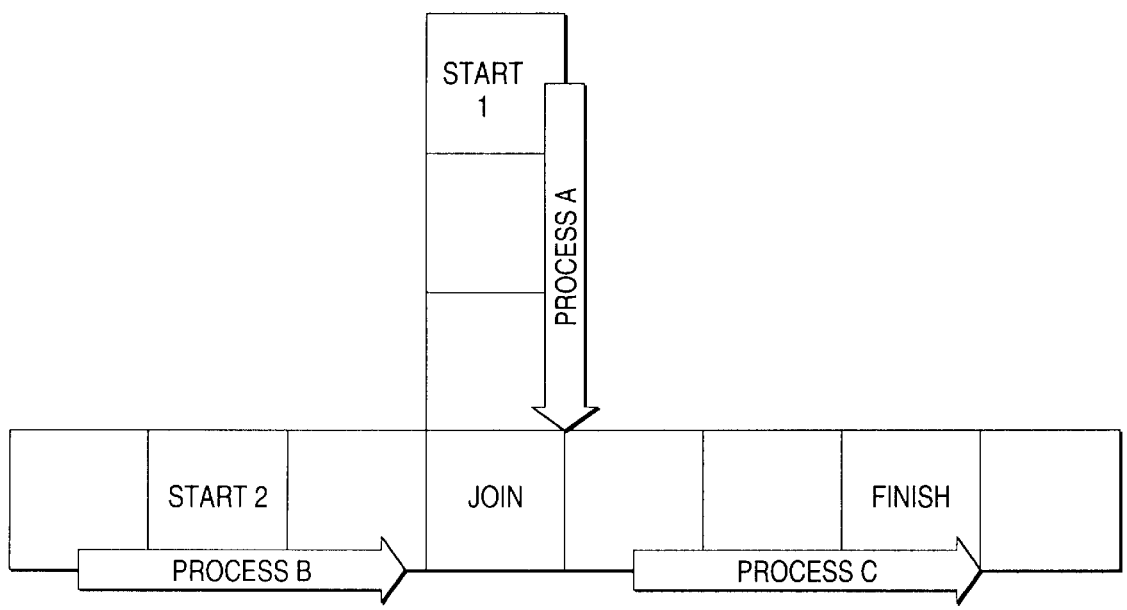

FIG. 22 is a yet another diagram for explaining the start/finish icon basis automatic execution control of FIG. 18.

Figure 23:
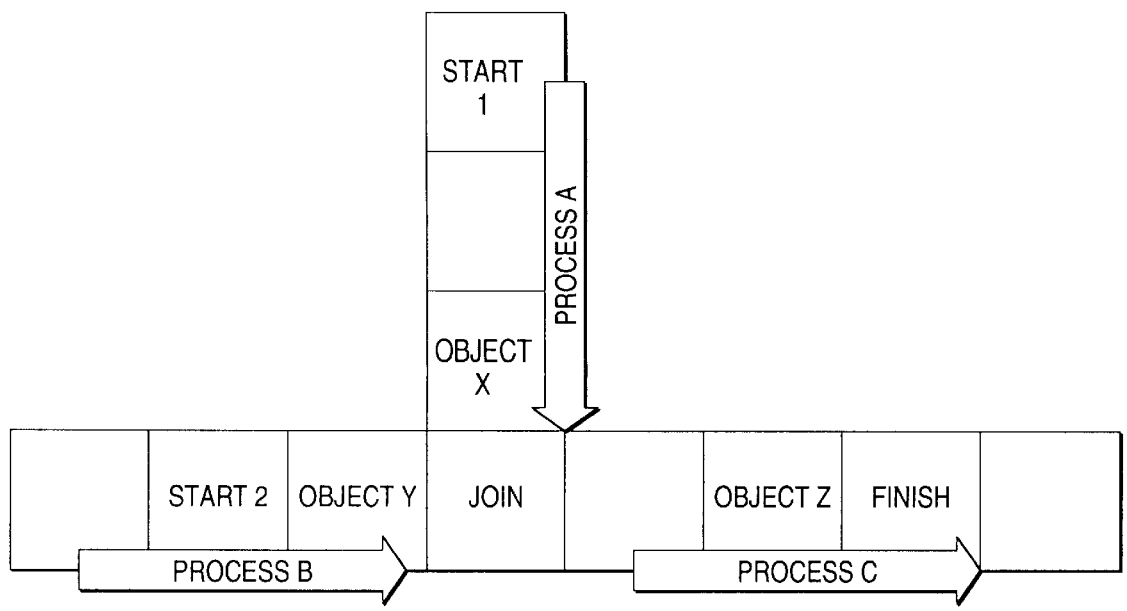

FIG. 23 is a further diagram for explaining the start/finish icon basis automatic execution control of FIG. 18.

Figure 24:
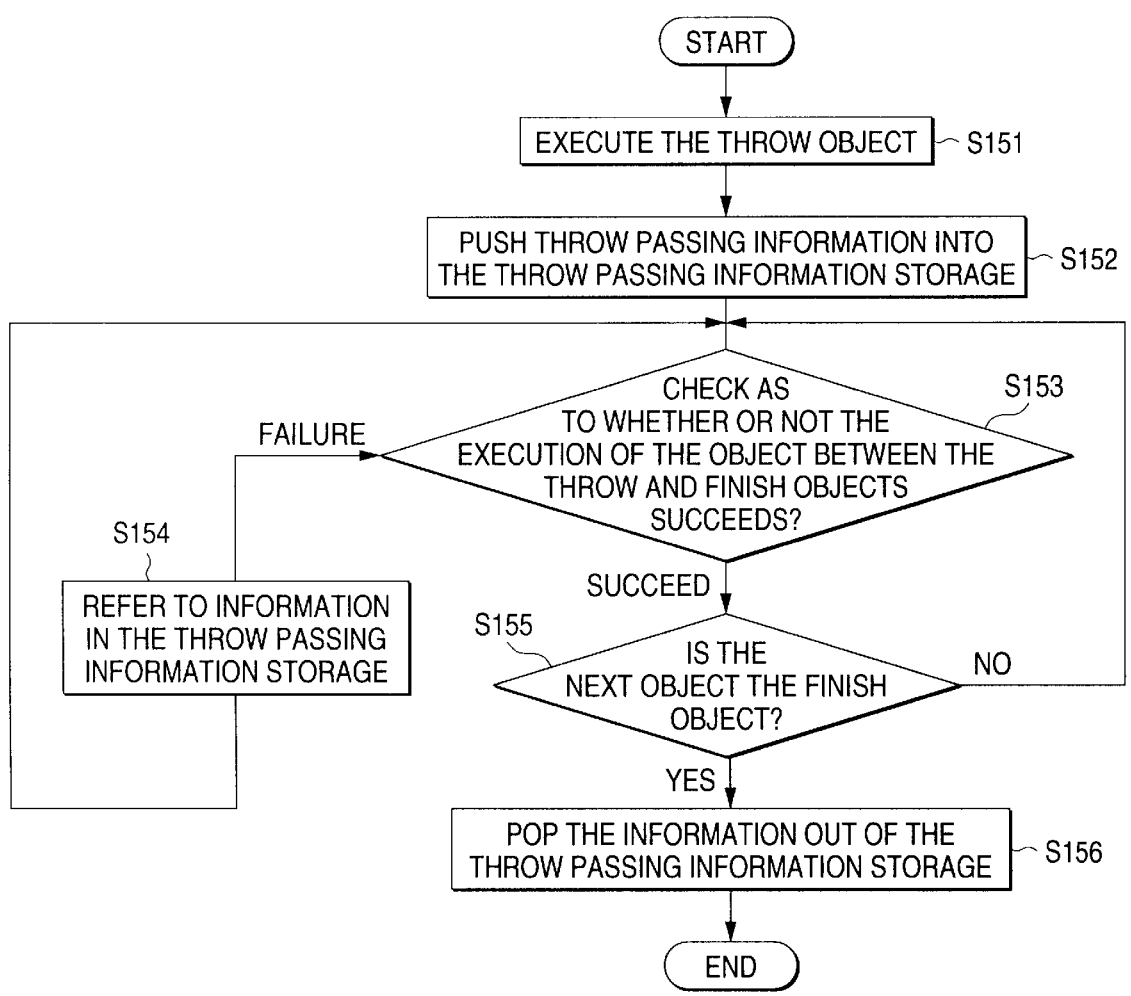

FIG. 24 is a flow chart for explaining the start/finish icon basis automatic execution control of FIG. 18.

Figure 25:
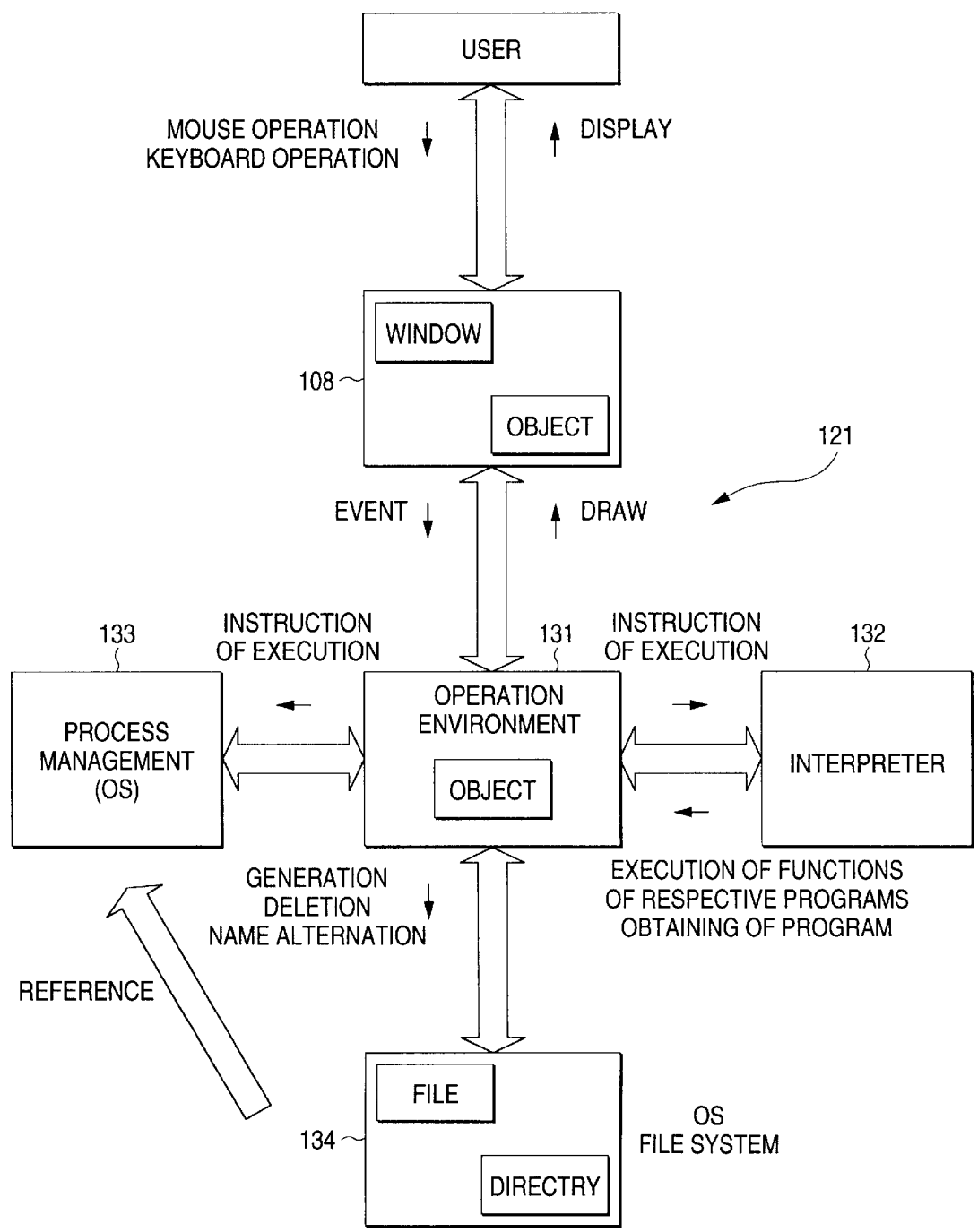

FIG. 25 is a diagram showing the detail of an interaction managing section in a third embodiment of the invention.

Figure 26:
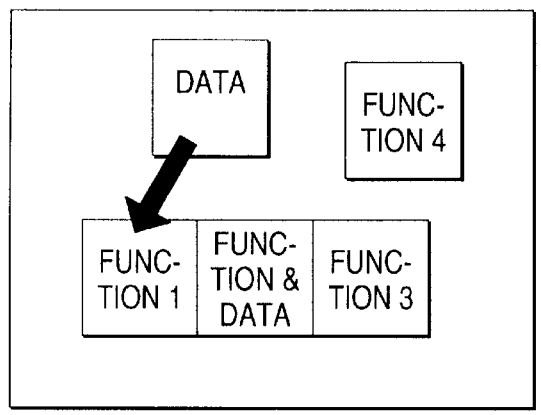

FIG. 26 shows an example of a program composed in the above embodiment.

Figure 27:
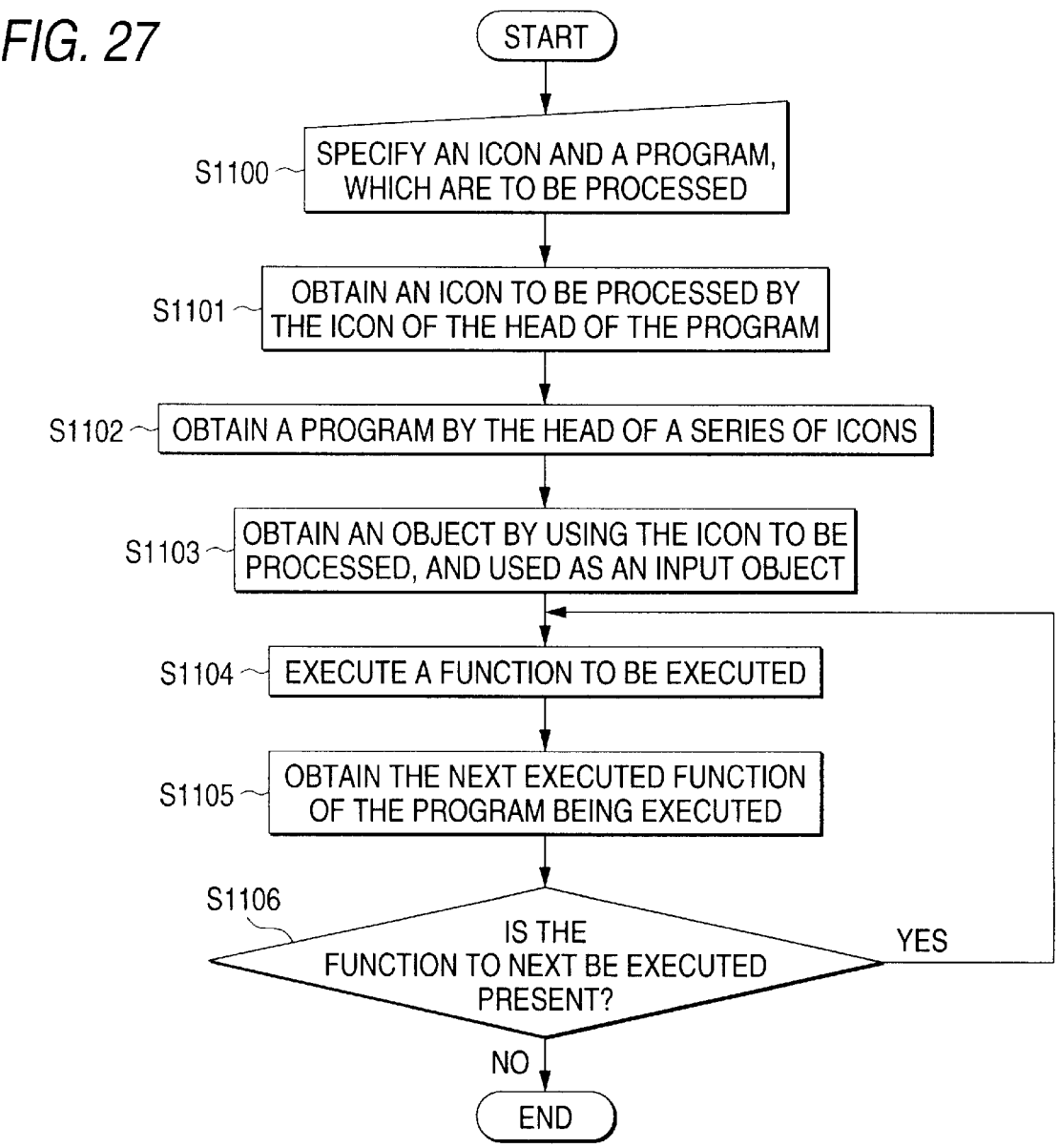

FIG. 27 is a flow chart useful in explaining an operation of the above embodiment.

Figure 28:
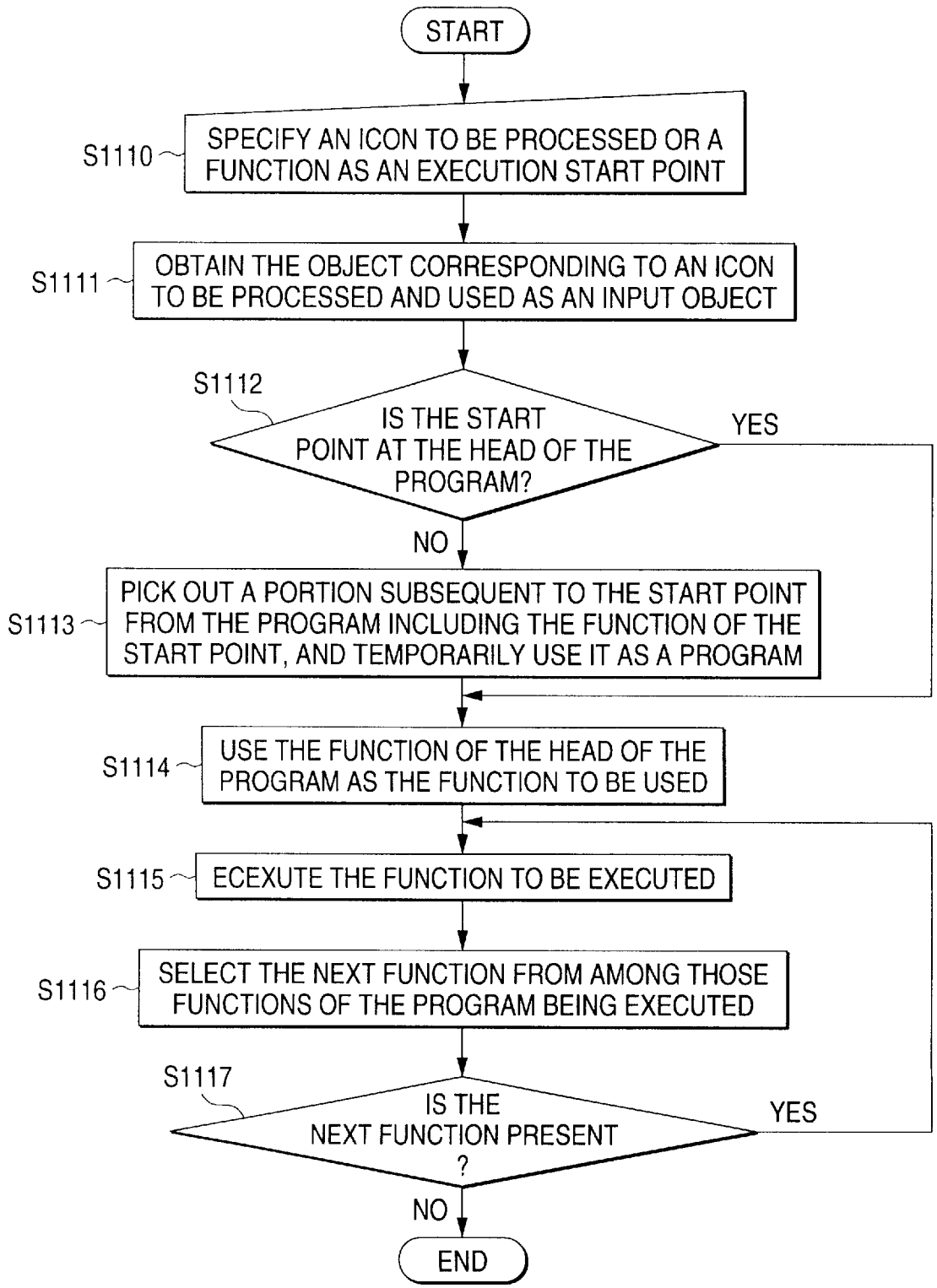

FIG. 28 is a flow chart useful in explaining another operation of the above present embodiment.

Figure 29:
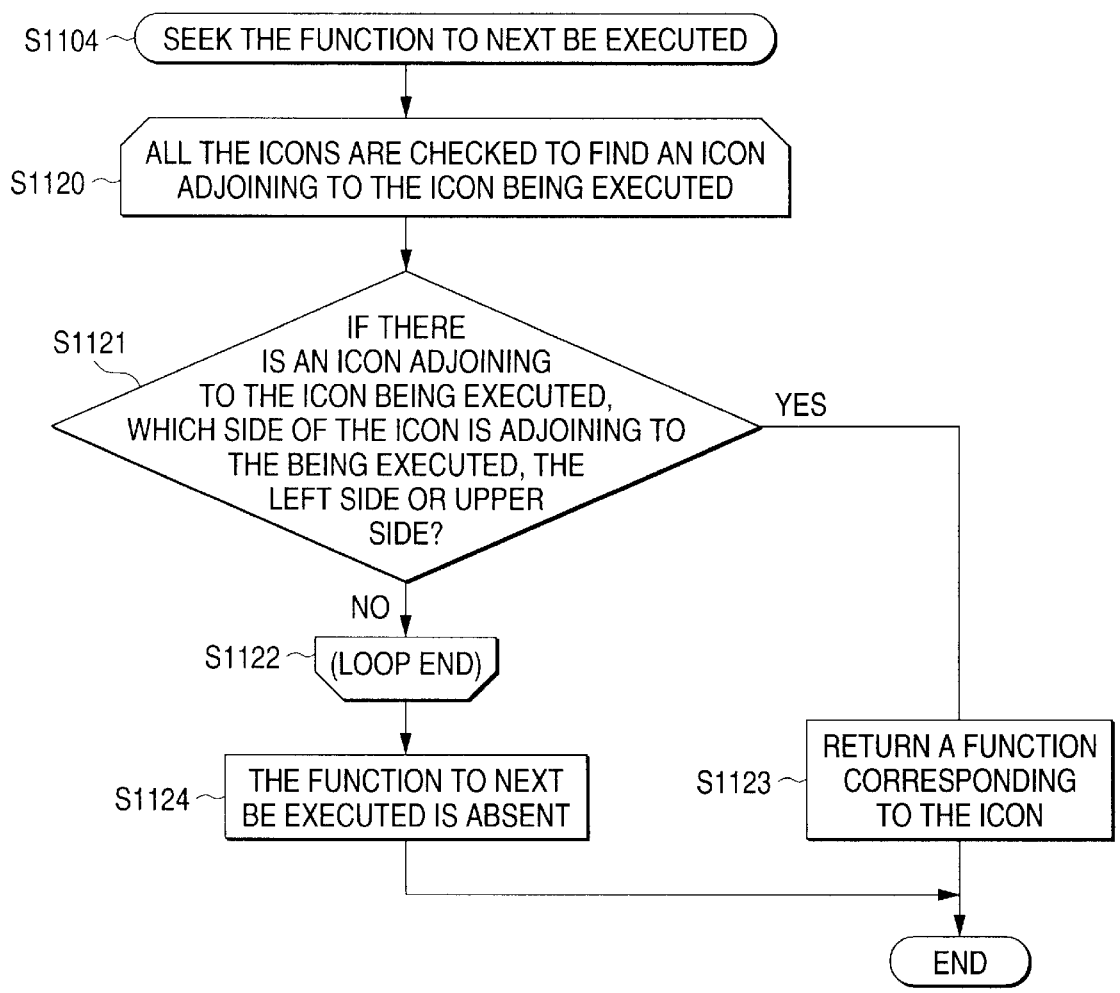

FIG. 29 is a flow chart showing the detail of the operation in key step in the flow chart of FIG. 27.

FIGS. 30(A) to 30(D) are pictorial diagrams useful in explaining a case where an error occurs during the course of executing the program of FIGS. 6(A) to 6(E).

Figure 30:
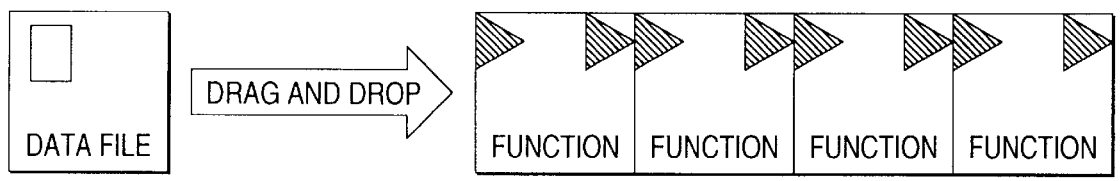
Figure 30:
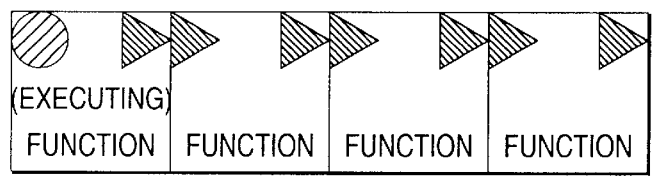
Figure 30:
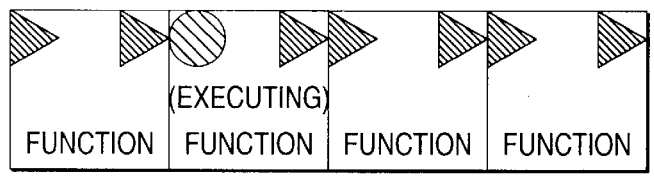
Figure 30:
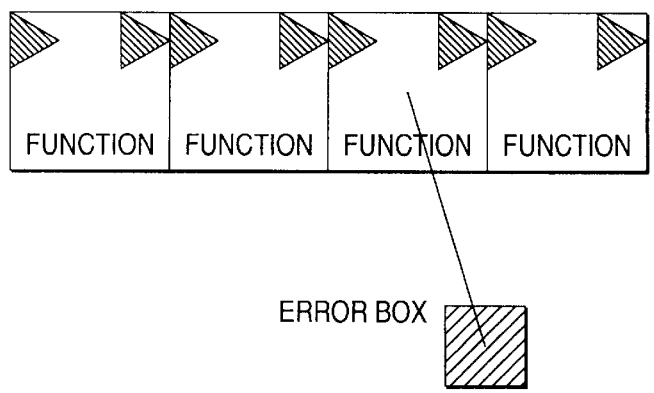
Figure 31:
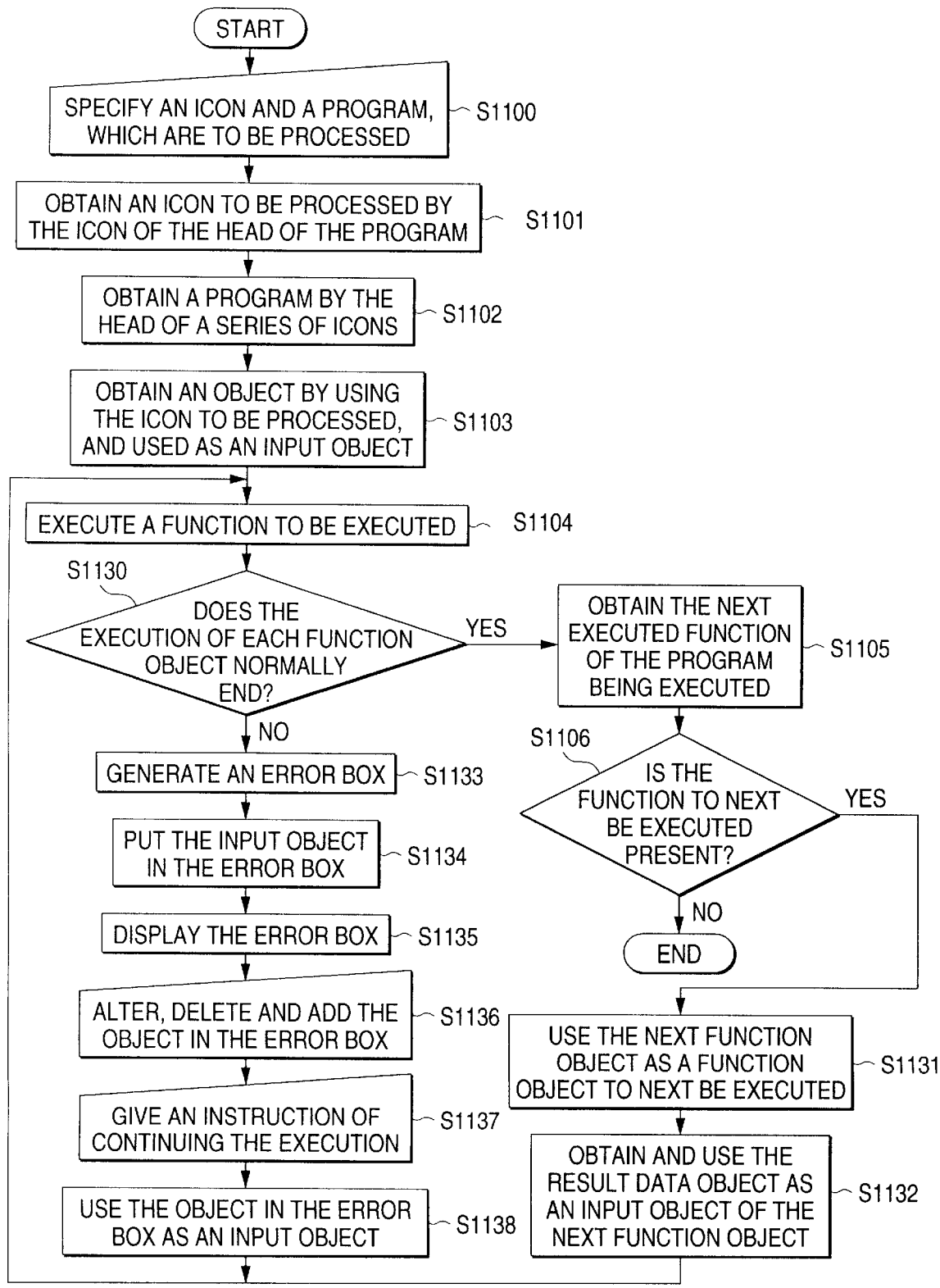

FIG. 31 shows a flow chart useful in explaining the operation of FIGS. 30(A) to 30(D).

FIGS. 32(A) to 32(E) are diagrams useful in explaining a modification of the embodiments.

Figure 33:
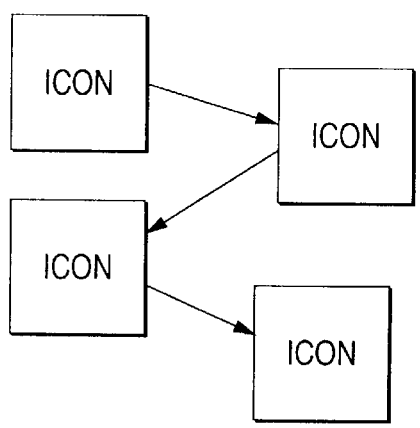
Figure 33:
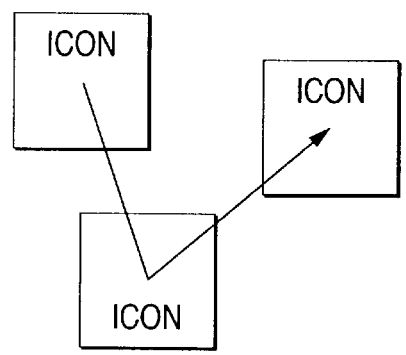

FIGS. 33(A) and 33(B) are diagrams useful in explaining another modification of the embodiment.

Figure 34:
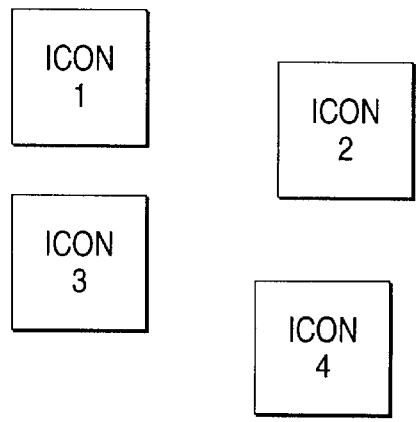

FIG. 34 is a diagram useful in explaining yet another modification of the embodiments.

Figure 35:
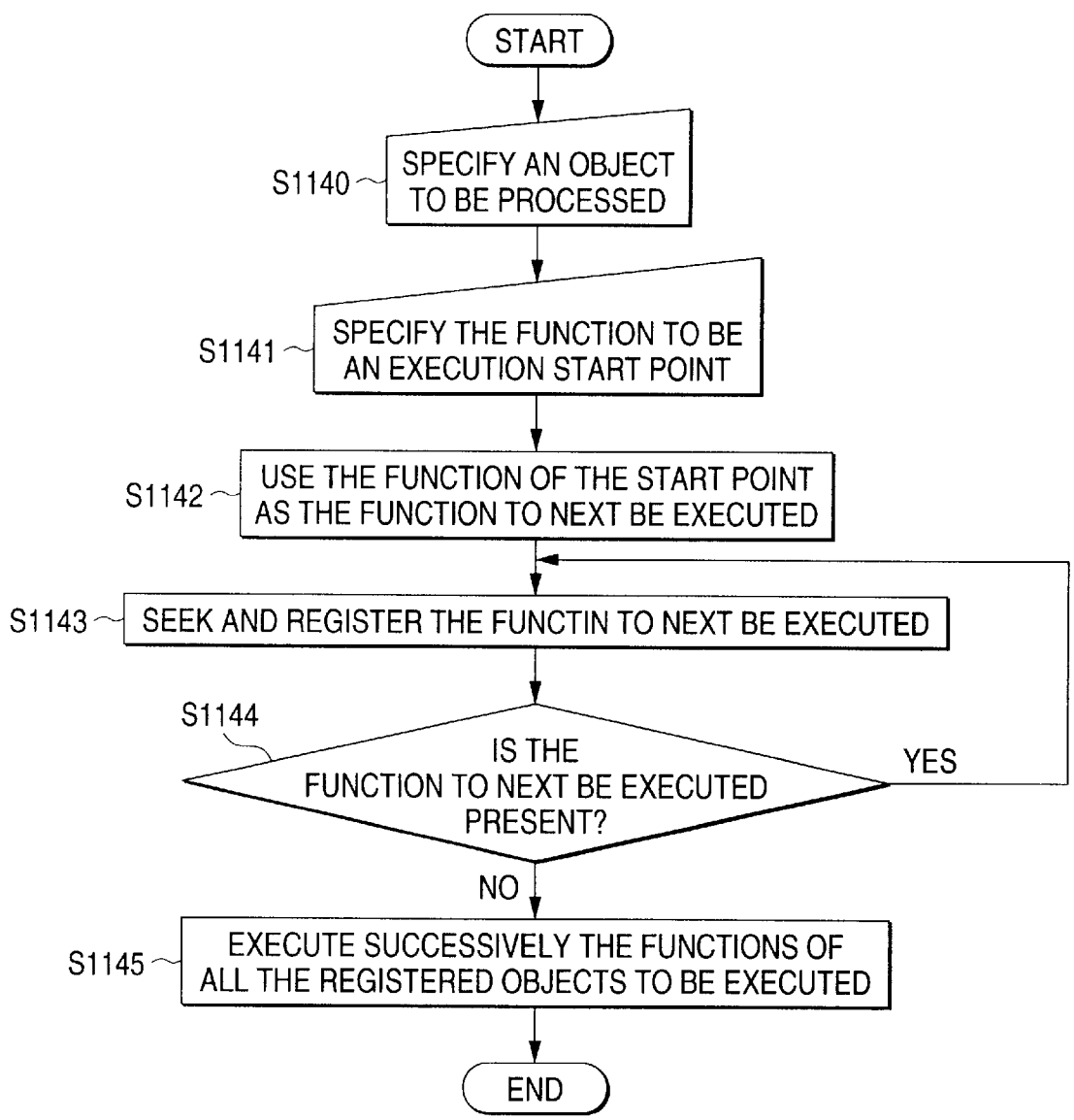

FIG. 35 is a diagram useful in explaining still another modification of the embodiments.

DETAILED DESCRIPTION OF THE INVENTION

Preferred embodiments of the present invention will be described with reference to the accompanying drawings.

[First Embodiment]

A first embodiment of the present invention will first be described.

Figure 1:
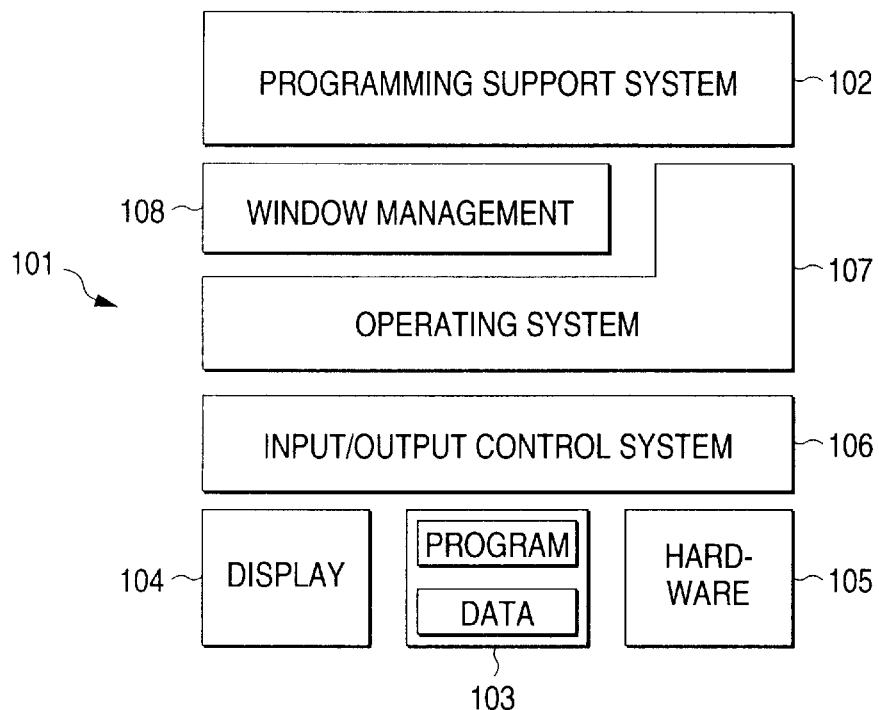

FIG. 1 shows a diagram of an environment into which a programming support apparatus of the present invention is installed. In the figure, a programming support apparatus 100 is realized in the form of a program of a programming support system 102, which is executed by a computer 101. The computer 101 includes an external storage 103, a display 104, and other hardware 105. An input/output control system 106, an operating system 107, and a window management system 108 are installed into the computer 101.

In the programming support apparatus 100, functions (program), data, and a composition (e.g., directory) of the function and data are handled as objects. An object is displayed, on a display window, in the form of a rectangular icon (pictorial character) corresponding to the object. The contents of the object are visualized by double clicking the icon of an object on the screen. If an object is a document, the contents of the document are displayed. If an object is a directory, a list of icons of other objects belonging to the directory object are displayed. "To double click an icon" means to specify an icon by a cursor (place a cursor on an icon) and to click a button of a mouse device (referred to as a mouse) successively two times within a given time period (depress the button and releases it from being depressed).

Figure 2:
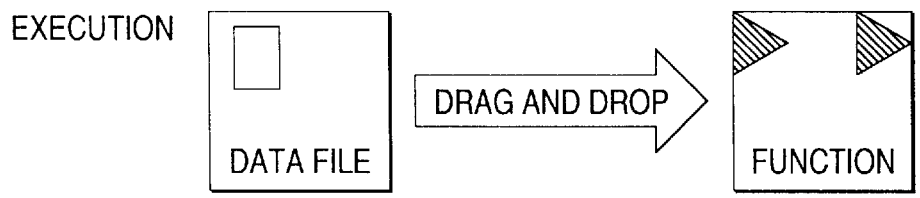
Figure 2:
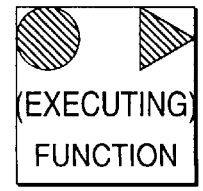
Figure 2:
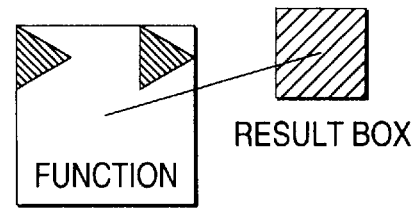

An operation to execute a function of an object of given data is shown in FIGS. 2(A) to 2(C). As shown in FIG. 2(A), the icon of the data object is moved to the icon of the function, and placed on the icon. Specifically, an operator moves a cursor of a mouse device (referred to as a mouse) to the icon of the object, and moves the mouse while depressing a button of the mouse (this operation is called "dragging"), to move the cursor to the icon of the function. Finally, he releases the button from being depressed (this operation is called "dropping"). As the result of the dragging/dropping operations, the function is executed for the data as shown in FIG. 2(B). After the function execution ends, a result box appears on the screen as shown in FIG. 2(C). When the result box is double clicked, the result of the process is visually presented.

Figure 3:
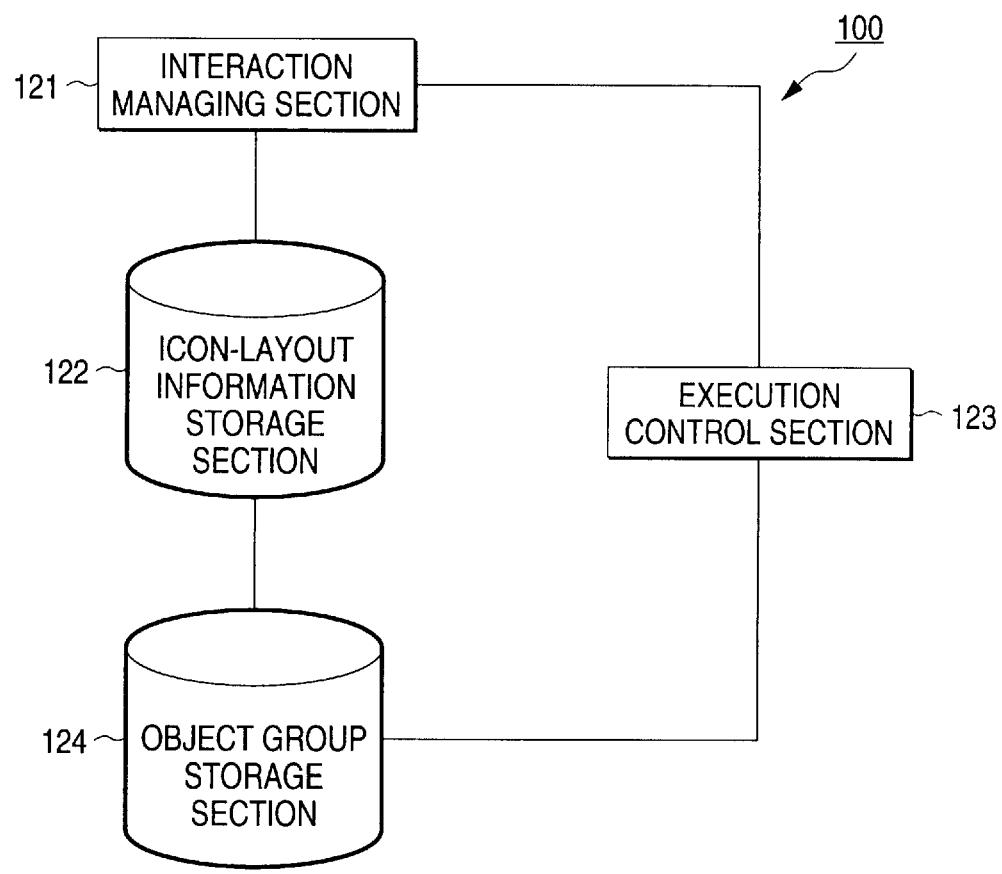
FIG. 3 is a functional block diagram showing an overall arrangement of the invention.

FIG. 3 is a functional block diagram showing the programming support apparatus 100 in FIG. 1. The programming support apparatus 100 is made up of an interaction managing section 121, an icon-layout information storage 122, an execution control section 123, and an object group storage 124.

The interaction managing section 121 recognizes operations of the mouse and a keyboard, and makes a change of the icon position, an addition of the icon, and the like on the basis of the result of the recognition. The program storage 122 stores the current icon layout, and information to specify objects of the icons (stored in an object group storage 124).

When the interaction managing section 121 recognizes a change of the position of an icon, the contents stored in a corresponding memory location in the program storage 122 are updated. The execution control section 123 determines an order to execute the functions of icons on the basis of the icon layout information that is stored in the program storage 122, read out an object corresponding to the icon from the object group storage 124, and executes the object.

The execution control section 123 controls the functions corresponding to icons according to the following rules.

1) When two icons are located side by side in a state that the right side of the left icon is in contact with the left side of the right icon, the function of the left icon is first executed and then the function of the right icon is executed.

2) When two icons are located one on the other in a state that the lower side of the upper icon is in contact with the upper side of the lower icon, the function of the upper icon is first executed and then the function of the lower icon is executed.

Figure 4:
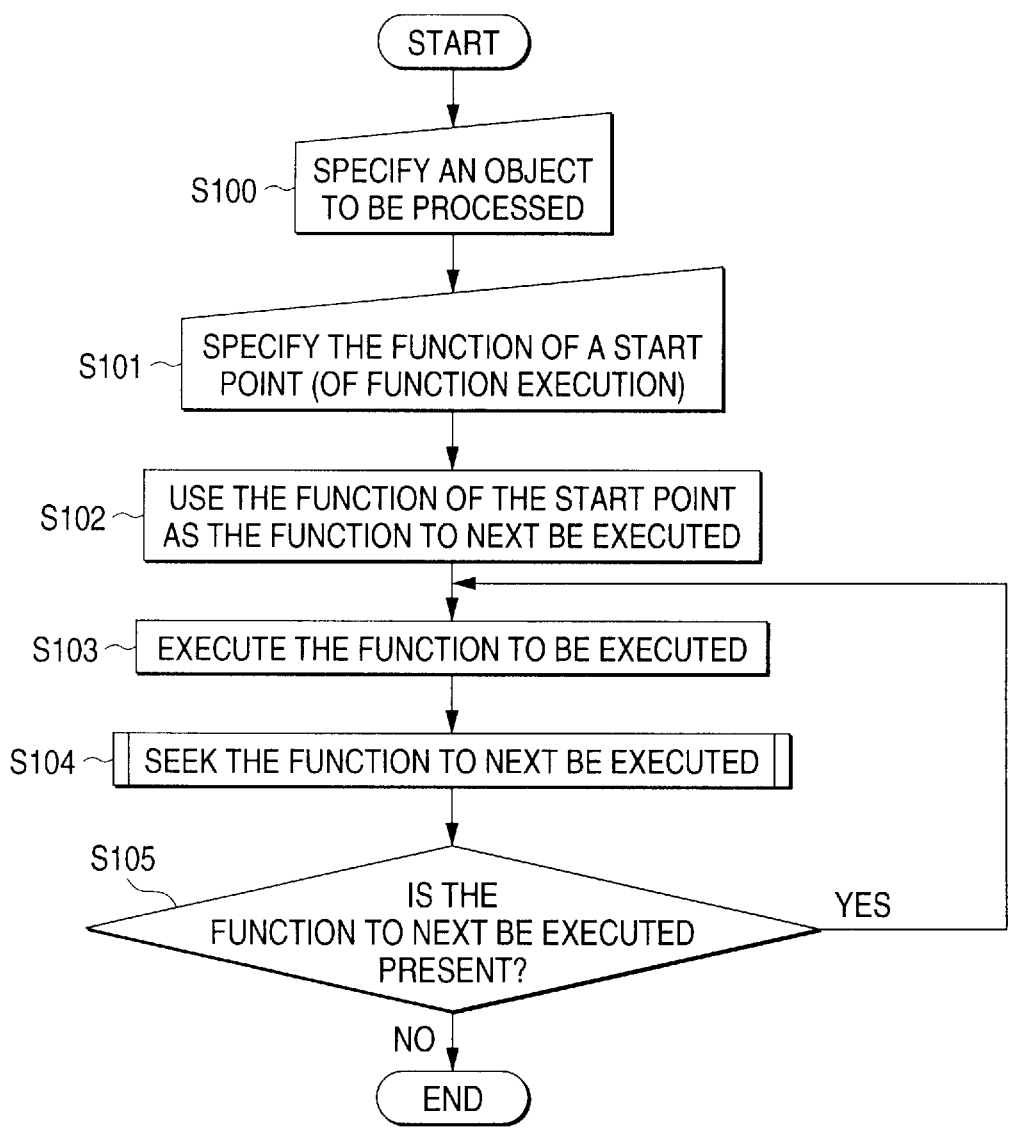
FIG. 4 is a flow chart useful in explaining an operation of a first embodiment.

FIG. 4 is a flow chart useful in explaining an operation of the present embodiment. To start with, an object to be processed is designated (S100). Specifically, a dragging operation of the icon of the object to be processed starts. Then, the function of a start point is designated (S101). Specifically, the icon of the processed object is dropped on the icon of the start point function. In response to this, the start point function is registered as a function to be executed (S102). Subsequently, a function to be executed is executed, and a function to next be executed is sought ((S103, S104). If a function to next be executed is present, the step S103 is executed again and repeats the operation ranging from this step to the subsequent ones (S105). If a function to next be executed is absent, the operation ends.

Figure 5:
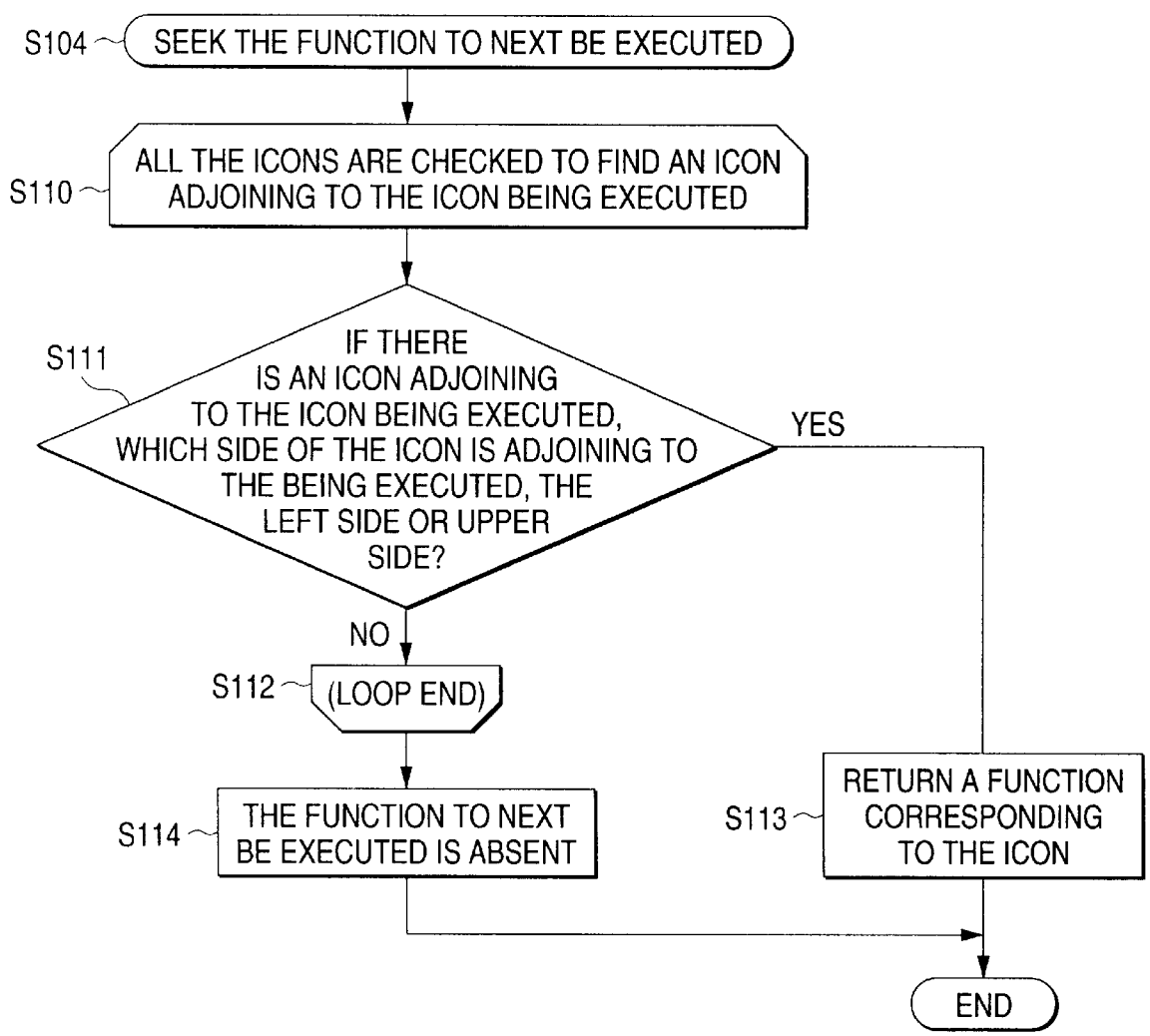
FIG. 5 is a flow chart showing the detail of the operation in key step in the flow chart of FIG. 4.
Figure 6:
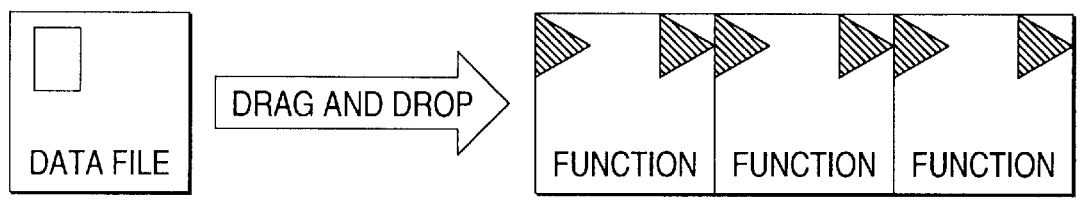
Figure 6:
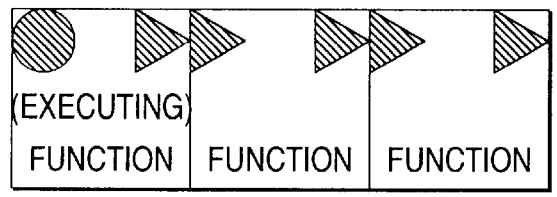
Figure 6:
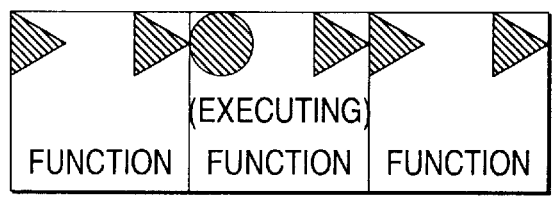
Figure 6:
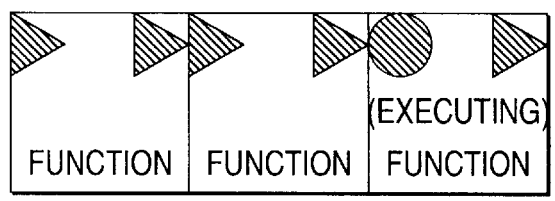
Figure 6:
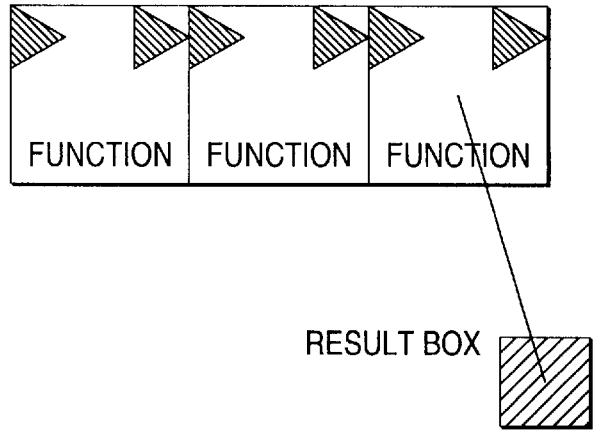

FIG. 5 is a flow chart showing the detail of the operation in the step S104 in FIG. 4. In the figure, all the icons are checked as to whether or not there is an icon of which the left or upper side is adjoining to the icon being executed (or just after the execution of it ends) (S110 to S112). If there is an icon being in contact with the currently executed icon, a function corresponding to the icon is returned (S113). In the step S103 in FIG. 4, the function is executed. If there is not an icon being in contact with the currently executed one, the operation ends (S114).

How to compose a program in the above-mentioned embodiment will be described.

[Basic Programming]

FIGS. 6(A) to 6(E) are diagrams useful in explaining how to compose a basic program. In the figure, a plural number (e.g., three) of function icons are horizontally arrayed while being in contact with one another. A program is composed by combining those three icons. An icon of a data file is dragged to and dropped in the leftmost icon of the function icon series (FIG. 6(A)). The function of the leftmost icon is executed for the data file, the output of the leftmost icon is transferred to the function of the second icon counted from the left (FIGS. 6(B) to 6(C)). The function of the second icon is executed for the output and the output of the second icon is transferred to the function of the final icon of those function icons (FIGS. 6(C) to 6(D)). When the function of the final icon is executed for the output of the second icon, final data is obtained (FIG. 6(D)). When the final data is obtained, a box representative of the result is displayed (FIG. 6.E)). By clicking the result box, final data is displayed.

In the example of FIGS. 6(A) to 6(E), the icons are arrayed from right to left. A flow of processings may be controlled in a similar way if the icons are arrayed from top to bottom. The same thing is true for a combination of two icon series; one icon series consists of icons arrayed from right to left and the other consists of icons arrayed from top to bottom.

[Joining Programming]

FIG. 7 is a diagram showing how to compose a program by combining a plural number of functions so that the processing sequences of two processes meet each other. In FIG. 7, one icon (shaded) is adjoining to other icons such that the upper, right and left sides of the shaded icon are in contact with those other icons. In this case, a process A (data X) and a process B (data Y) meet to compose a process A+B (data X+Y). The composite process is executed. The function corresponding to an icon at the junction temporarily stores first received data (e.g., X of process x), and triggers to execute the composite process A+B after receiving other data (e.g., data Y).

As shown in FIGS. 8 and 9, the function at the junction starts the process A for first received data, and temporarily stores data X in an internal storage 130 (S120, S121). Then, it stops the process A (S122). Thereafter, it receives data Y and starts the process B (S123), processes data Y and data X read out of the internal storage 130, and ends the processes A and B (S124, S125).

[Branching Programming]

FIG. 10 is a diagram showing how to compose a program by combining a plural number of functions so as to branch a flow of processings. In FIG. 10, one icon (shaded) is adjoining at the lower side and the right and left sides to other icons. A flow of processings is branched at the branching point into two flows of processings. The ways of the branching of the processing flow are: 1) conditional branching, 2) sequential branching, 3) branching for each data, 4) branching attendant with data copy, and 5) alteration to the same data. The flow of processings may be branched in a manner that a window is opened by operating the icon at the branching point.

In the conditional branching 1), a branching condition is set in the function of the icon at the branching point, and only one of the branched processing flows is executed.

In the sequential branching 2), one of the branched processing flows is first executed, and after its execution ends, the other branched processing flow is executed. FIG. 11 shows a diagram showing how to carry out the sequential branching process. For the programming technique, the programming based on the conditional branching, and a programming in which data is copied and a plural number of processes are concurrently executed as in the "fork" in a UNIX (trade mark) system are known. When the sequential branching technique is applied to a program based on the conditional program, a program must be described such that data at the branching point is temporarily stored in a given memory area. After the execution of one process ends, the data is read out and the other process is executed. This is troublesome for general users. In the case of the fork, original data and data copy are independently processed after the copy processing. Therefore, it is difficult to apply the sequential processing to the fork. It is noted here that in the present embodiment, the sequential branching may easily be set in a simple manner that icons are combined so as to branch the processing flow, and a branching mode is set in the icon at the branching point.

FIG. 12 is a flow chart showing how to execute the sequential branching process of FIG. 11. In FIG. 12, a process X starts and the branching icon is reached (S130, S131). Then, the execution control section 123 registers a branching point (S137). The process A, which is set to first be executed, is executed (S132). The execution control section 123 monitors the end of the execution of the process A (S132), and starts the process B when the process A execution ends (S133, S139). Thereafter, the process B is executed and its execution ends (S135, S136).

In the each-data branching technique 3), when the function of the branching point outputs a plural number of data, those data are transferred to branched processing flows, respectively. The branching may be made by utilizing the sequential branching technique 2) (FIG. 12). In the each-data branching, objects to be processed, which are processed by the subsequent process B (FIG. 11), are registered, in addition to the branching point. A specific example of the each-data branching is given where a branching object outputs a plural number of information to be processed, and those processed information are correlated with subsequent processings (so set by a branching icon) as follows:

a : process A
b : process B
c : process A
d : process B
e : process B

In this example, a branching point, and the processed objects b, d and e are registered. Then, the process A is first executed for the processed objects a and c, and after its execution ends, the process B is executed for the processed objects b, d and e.

The branching attendant with data copy 4) acts like the "fork" in the UNIX (trade mark) system. In this case, the branched processes receive the outputs of the object at the branching point, and process the outputs in their own ways.

In the alteration to the same data 5), a plural number of processings are executed for the same data, so that the results of the processings are reflected in one processing. This alteration technique 5) also utilizes the sequential branching technique 2). When the branching object produces processed information a, the alteration technique 5) stores the output information in a secondary storing device provided outside the system, and correlates the output information with the subsequent processings in the following way:

Pointer (path) to a: process A, process B Further, when the processed information is used as an input to the processes A and B, information to the effect that it is not the processed information per se, but a pointer to the processed information is sent to the subsequent processing. In response to this, the process A analyzes the path to the input processed information a and edits the substance of the information a. Following the process A, the process B is triggered for execution.

If similar processings are a synchronously executed in different processes as in the "fork", the processings for the substance of the information a are concurrently executed. A user cannot estimate the result of alteration.

[Second Embodiment]

A second embodiment of the present invention will be described. In the information process in the first embodiment mentioned above, the user triggers the execution of a function. For example, the user drags an icon of an object to be processed to and drops it on the icon of a function object to be triggered. In the second embodiment, the trigger and retrigger of the execution are automatically controlled by using an object for controlling an automatic execution and its icon. In the control of an automatic execution shown in FIGS. 13(A) and 13(B), an icon, called a gate icon, is interposed between a data icon and a function icon. The gate icon functions such that when a predetermined condition is satisfied (e.g., a time point is reached), data is transferred to the function of a subsequent icon. In FIG. 13(A), the condition is not yet satisfied. Subsequently, in FIG. 13(B), the condition is satisfied, the function corresponding to the subsequent icon receives data and progressively processes it.

The automatic execution control may be realized by any of 1) gate icon, 2) trigger line (trigger icon), and 3) start/finish icon.

The gate icon of 1) transfers (opens the gate) the output of a preceding object (the processing result when it is a function object, and data per se when it is a data object) to the subsequent object when a predetermined condition is satisfied.

The trigger line of 2) connects an icon as a start point with another icon as an end point, and triggers an end point icon after a preset time elapses since the function of the start point icon ends in execution. The preset time may be zero (0). An example of this is given. An object (start point) of a first series of objects is connected with a trigger object (end point) of a second series of objects. Immediately or after a preset time elapses after the start point object of the first series of objects is executed, the start point object of the second series of objects is triggered and the subsequent function is executed.

In a modification of the trigger line, the function of the trigger icon is assigned to the trigger line per se, and a normal function icon is used as an end point of the trigger line.

The start/finish icon of 3) controls the automatic process execution in such a manner that when the object corresponding to an icon interposed between a start icon and a finish icon fails to produce an expected result (for example, when an error occurs or when a filtering function that permits the processing result satisfying a condition to pass, produces nothing when it is executed), the start icon is used again and the process is executed again.

FIG. 14 is a functional block diagram showing an overall arrangement of the second embodiment. In the figure, a programming support apparatus 200 is made up of an icon-layout information storage 122, an object group storage 124, an object status information storage 140, an automatic execution managing section 141, and an execution control section 103. The object group storage 124 stores objects. The icon-layout information storage 122 manages the layout of all the icons, and information to specify objects that are stored in the object group storage 124. The object status information storage 140 stores a status of an automatic execution object, such as a gate object, whether or not it is ready for the automatic execution, and a condition for the automatic execution. When a status of the gate object, for example, is changed from an automatic execution trigger impossible state to an automatic execution trigger possible state by an instruction by a user, for example, the object status information storage 140 registers an object to be automatically executed and an automatic execution condition of the object in the automatic execution managing section 141.

The automatic execution managing section 141 continually judges whether the automatic execution condition of the object, registered, is satisfied or not. If an object whose automatic execution condition is satisfied appears, the automatic execution managing section 141 requests the execution control section 103 to execute the object.

The execution control section 103 inquires of the object group storage 124 as to whether or not the object is present therein. If it is present, the execution control section 103 acquires layout information of the object from the icon-layout information storage 122. The execution control section 103 acquires the objects corresponding to icons, which are located before and after the object to be automatically executed, from the icon layout information, and transfers the object of the icon located before the automatically executed object as an object to be processed to the object of the icon located after the automatically executed object, whereby it controls the resultant successive executions.

[Programming by Gate Icon]

FIG. 15 shows a flow of an operation of controlling an automatic execution by using a gate icon. In the figure, it is judged as to whether or not there is a gate object satisfying the condition. If the answer is YES, an object corresponding to the gate icon is specified (S140, S141). Layout information corresponding to the gate object is acquired (S142). It is checked as to whether or not objects are located before and after the gate icon. If the answer is YES, the objects corresponding to the objects before and after the gate icon are specified (S143, S144). Then, an output of the object preceding to the gate object is set as an object to be processed by the object subsequent to the gate icon (S145).

Figure 13:
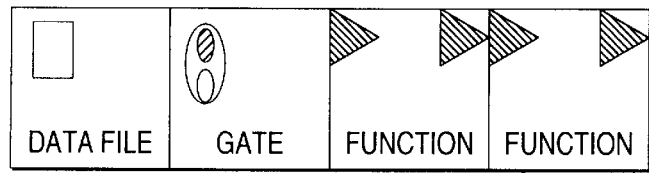
Figure 13:
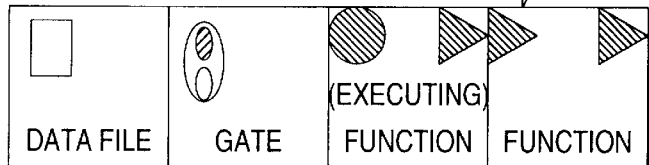

While the gate icon is located between the data icon and the function icon in the example of FIG. 13, the gate icon may be located between the function icons as shown in FIG. 16. In this case, the execution of a process triggered stops before the gate object, and after the condition of the gate object is satisfied, the function object subsequent to the gate object is progressively executed.

[Programming by Trigger Line]

FIG. 17 shows an example of the trigger line. A function icon X in a process series A is connected with a trigger icon 151 in a process series B by a trigger line 150. A trigger time difference is set in advance by using the trigger line 150. Connection information of the trigger line and the trigger time difference are registered in the automatic execution managing section 141. A user drags/drops information to be processed to an icon of the head of the process series A, and then the process series A is triggered. The objects corresponding to the icons in the process series are successively executed, and the object of the icon X is triggered. After the trigger time difference elapses, the object corresponding to a trigger icon in the process series B transfers information to be processed to the function object of the function icon. The execution of the process series B starts and continues. On the other hand, thereafter, the process series A successively executes the objects. The trigger time difference may be set to zero (0) by using a trigger icon 151, as a matter of course.

In this case, the trigger object corresponding to the trigger icon operates as shown in FIG. 15, and triggers the process execution. In this example, the trigger object is used for the automatic execution object, in place of the gate object in FIG. 15.

[Start/Finish Object]

An example of the automatic execution control using a start icon and a finish icon is shown in FIG. 18. In this example, when the execution of a start object ends, the automatic execution managing section 141 writes (pushes) information indicating that which of the start objects has ended in its execution into a start passing information storage 152 of the stack type. Thereafter, the subsequent objects are sequentially executed, and a finish object is executed. Then, the automatic execution managing section 141 clears (hops) the start passing information finally stored in the start passing information storage 152. In this case, all the objects are executed once for each, and the execution of the whole process is normally completed.

FIG. 19 is a diagram showing an example of the automatic execution control when the process execution between the start icon and the finish icon fails to produce an expected result, for example, when an error occurs. When the execution of a start object ends, the automatic execution managing section 141 writes (pushes) information indicating that which of the start objects has ended in its execution into the start passing information storage 152.

The subsequent objects are sequentially executed, and an error occurs in an object indicated by an arrow A and the execution is interrupted. In this case, the automatic execution managing section 141 refers to the contents of the start passing information storage 152. If start passing information is present in the start passing information storage 152, an object containing a description of start passing information issues an instruction to restart the execution for transmission to the execution control section 123.

After the execution restarts, the objects are sequentially executed in a similar manner. If the execution normally progresses normal till a finish object is executed, then the automatic execution managing section 141 clears (hops) the start passing information finally stored in the start He passing information storage 152. Thereafter, the subsequent objects are sequentially executed.

Thus, when an error occurs between the start object and the finish object, the execution is repeated till the objects strung to the finish objects are all normally executed. If those objects are all normally executed, the execution of the whole process is normally completed.

FIG. 20 is a diagram showing an example of start/finish icon basis automatic execution control in which plural sets of start and finish icons are used. As shown, a set of start and finish icons 2 is located between a start icon 1 and a finish icon 1. These objects are sequentially executed, and when the execution of the start icon 1 ends, the automatic execution managing section 141 writes (pushes) information indicating the end of the execution of the start object 1 into the start passing information storage 152. The sequential execution of the objects further progresses, and the execution of the start object 2 ends. Then, the automatic execution managing section 141 writes (pushes) information indicating the end of the execution of the start object 2 into the start passing information storage 152.

The object execution further progresses, and the execution of the finish object 2 ends. Then, the automatic execution managing section 141 clears (pops) the start passing information finally stored in the start passing information storage 152 (information indicating the end of the execution of the start object 2). The object execution further progresses, and the finish object 1 is executed. Then, the automatic execution managing section 141 clears (pops) the start passing information left in the start passing information storage 152 (information indicating the end of the execution of the start object 1).

FIG. 21 is a diagram for explaining a case where an error occurs in the automatic execution control of FIG. 20. In this case, it is assumed that an error occurs in an object A or B. The objects are sequentially executed, the execution of the objects 1 and 2 ends, an error occurs in the object A, and the object execution is interrupted. Then, the automatic execution managing section 141 refers to the element that is finally stored into the start passing information storage 152. In this case, information on the start object 2 is the finally stored element since an error occurs in the object A. Therefore, the automatic execution managing section 141 instructs the execution control section 123 to restart the object execution from the start object 2.

When an error occurs in the object B and the execution is interrupted, information on the start object 2 has been popped out of the start passing information storage 152. Therefore, information that is referred to, at this time point, by the automatic execution managing section 141 is information on the start object 1. Therefore, the automatic execution managing section 141 instructs the execution control section 123 to restart the object execution from the start object 1.

FIG. 22 is a diagram showing an example of the start/finish icon basis automatic execution control when it is applied to a case where two processing flows meet each other. As shown, two processing sequences of processes A and B meet each other at a junction object into a process C. The objects strung from the junction object forward are processed as one sequence of the process C. As shown, start objects 1 and 2 are contained in the processes A and B, respectively, and a finish object is contained in the process C. In this example, the automatic execution managing section 141 independently controls the two processing sequences preceding to the junction object as independent processes, and controls the processing sequence subsequent to the junction object as a single process.

In the process A, execution of the start object 1 ends. Then, start passing information (start object 1) is pushed into the start passing information storage A, which is exclusively provided for the process A. In the process B, execution of the start object 1 ends. Then, start passing information (start object 2) is pushed into the start passing information storage B, which is provided exclusively for the process B.

The two sequences meet at the junction object into the process C. Incidentally, the automatic execution managing section 141 independently holds the start passing information storages A and B. The process C is sequentially executed, and the finish object is executed. Then, the automatic execution managing section 141 pops the information out of the start passing information storages A and B.

FIG. 23 is a diagram showing the case where an error occurs in the example of FIG. 22. In the figure, when an error occurs in an object X, the automatic execution managing section 141 refers to information stored in the start passing information storage A for the process A, which contains the object X suffering from an error, and instructs the execution control section 123 to restart the execution from the start object 1.

When an error occurs in an object Y of the process B, the automatic execution managing section 141 refers to information stored in the start passing information storage B for the process B, and instructs the execution control section 123 to restart the execution from the start object 2.

When an error occurs in an object Z of the process C, the automatic execution managing section 141 refers to information stored in both the start passing information storage A and B. When information is present in both the storage A and B, the automatic execution managing section 141 instructs the execution control section 123 to restart the execution from the start objects 1 and 2. When information is present in only one of the storages, the automatic execution managing section 141 instructs the execution control section 123 to restart the execution from the start object corresponding to the start passing information storage which stores information.

FIG. 24 shows a flow chart useful in explaining the operation described above.

Step S151 : Execute the start object.

Step S152 : Start passing information is stored into the start passing information storage 152.

Step S153 : Check as to whether or not the execution of the object between the start and finish objects succeeds.

Step S154 : If the execution of the object between the start and finish objects fails, control refers to information in the start passing information storage, and returns to the start object.

Step S155 : If the execution of the object between the start and finish objects succeeds, control checks if the next object is the finish object.

Step S156 : If the next object is the finish object, control clears the information in the start passing information storage 152, and control ends the control operation.

As seen from the foregoing description, in the embodiments of the present invention, by juxtaposing icons corresponding to objects, the user can simultaneously specify a function to be executed and set an order of executing functions. In this respect, the operability is improved. Further, in the invention, there is no need of displaying line segments to specify an execution order. Therefore, an expression of controls is explicit and handling becomes easy.

The data flow is coincident with the processing flow. Therefore, a process control can be controlled by merely controlling the output of data.

The user can independently select a desired process, and interrupt and restart the execution of the process.

By storing data, data can be transferred between at least two processes. Therefore, data controlled by a plural number of processes are stored, and those data can be processed in a batch processing manner.

A flow of data laid across a process is considered as the result of joining the processing flows of two processes. With this, a flow data is clearly presented to the user. Therefore, the user can easily control the flow of processings.

When the user desires to use data output from a specific object in the processing flows of two processes, the data is sequentially processed, and an order of processings is clearly presented to the user. Therefore, the user is released from a complicated processing, for example, an excluding processing ensuing from the parallel processings.

The invention enables the user to part different data every process. Therefore, the user can part the processings every data depending on a condition at the branching point.

A point to the same data may be processed by a plural number of sequentially executed processes. Therefore, a plural number of processings for the same data can be expressed intelligibly.

The process execution may automatically be triggered if a predetermined condition is satisfied, without any aid of the user.

The automatic execution can readily be programmed in a manner that an object for controlling the automatic execution is displayed in the form of an icon, and the function close to the icon is triggered for execution if a predetermined condition is satisfied.

A data flow between functions can be controlled in a manner that an object for controlling the automatic execution is displayed in the form of an icon, and the icons representative of functions are located on both sides of the object icon.

The triggering of the process execution may be controlled in different control sequences, by using a trigger line, and further the triggering time may be staggered.

Such a control that the execution of a sequence of processings is repeated till the execution of the processings is completed, is possible by using start and finish objects.

Next, a third embodiment of the invention will be described.

FIG. 25 is a diagram showing the detail of the interaction managing section 121 shown in FIG. 3. As shown, the interaction managing section 121 includes an operational environment control portion 131 and a window management system 108. An interpreter 132 and a process management portion (OS) form the execution control section 123 (FIG. 3). A file system (OS) 134 constitutes a part of the object group storage 124 and the program storage 122. An operation by the user in the window is detected as an event by the window management system 108, and supplied to the operational environment control portion 131. The operational environment control portion 131 sends an execution instruction based on the event to a process management portion 133 and the interpreter 132. When receiving an event corresponding to the execution of a single normal function or to a data display request, the process management portion 133 drives the file system 134 to generate a process and executes the function. In executing the function, the process management portion 133 makes an access to the file system 134. When the execution instruction is a program (a series of functions), the process management portion 133 acquires information on the program and gives an instruction on the execution of individual functions. The execution instruction is executed by the process management portion 133.

FIG. 26 shows a state where five icons are displayed in a window (display area). The icons represent "function 1", "function and data", "function 3", "function 4", and "data", respectively. Each icon may be moved to a desired position, and copied and deleted by operating the mouse. When the icon corresponding to any of the "function 1", "function and data", "function 3", and "function 4" is double clicked, the execution of the function corresponding to the icon double clicked is allowed to start. When the icon of "data" is doubled clicked, the data corresponding to the icon may be displayed or edited.

In FIG. 26, among the objects of the functions, the "function 1", "function and data", and "function 3" are adjacent to one another. In such a layout of the icons, when the icon of the "data" is dragged to and dropped in the icon of the "function 1", the "function 1", "function and data", and "function 3" are successively executed for the "data". In this case, the data given to the "function and data" may be neglected.

FIG. 27 is a flow chart useful in explaining an operation of the present embodiment. To start with, an icon and a program, which are to be processed, are specified (S1100). Specifically, an icon to be processed is dragged to and dropped in an icon (icon series). A program is obtained by the icon of the head of the program (S1101). When the icon to be processed is dragged to and dropped in the icon of the "function 3" (FIG. 26), for example, the "function 1" as the head of a series of icons is specified, and what starts at this point is recognized as a program. An object is obtained from the head of the program, and used as a function to next be executed (S1102). Then, a data object corresponding to the function is obtained by using the icon to be processed, and used as an input object (S1103). A function to be executed is executed and a function to next be executed is sought (S1104 and S1105). If a function to next be executed is present, the step S1104 is executed again (S1106) and the operation ranging from this step to the subsequent ones is repeated. If a function to next be executed is absent, the operation ends.

FIG. 28 is a flow chart showing an operation of the present embodiment when a program execution is triggered at the middle of a program. In the figure, an icon to be processed or a function as an execution start point is first specified (S1110). Specifically, a function as an execution start point is selected from among those functions of a program, and an icon to be processed is dragged to and dropped in an icon corresponding to the selected function. By using the icon to be processed, a corresponding object is obtained and used as an input object (S1111). When the start point is at the head of the program, a step S1114 is executed where the function of the head of the program is used as a function to be executed, and executed (S1114 and S1115). When the start point is not at the head of the program, a function subsequent to the start point of the program is picked up from the program including the start point, and is temporarily used as a program and the step S1114 is executed. After the execution of the function ends, the next function is obtained from among those functions of the program being executed (S1116). If the next function is present, the step S1115 is executed again. If the next function is absent, the operation ends (S1117).

FIG. 29 is a flow chart showing the detail of the operation in the step S1105 in FIG. 27 (identical to that in step S1116 in FIG. 28). In the figure, all the icons are checked as to whether or not there is an icon of which the left or upper side is adjoining to the icon being executed (or just after the execution of it ends) (S1120 to S1122). If there is an icon being in contact with the currently executed icon, a function corresponding to the icon is returned (S1123). In the step S1104 in FIG. 27, the function is executed. If there is not an icon being in contact with the currently executed one, the operation ends (S1124).

How to compose a program in the above-mentioned embodiment will be described.

The way of composing a basic program is the same as the first embodiment as shown in FIGS. 6(A) to 6(E). That is, a plural number (e.g., three) of function icons are horizontally arrayed while being in contact with one another. A program is composed by combining those three icons. An icon of a data file is dragged to and dropped in the leftmost icon of the function icon series (FIG. 6(A)). The function of the leftmost icon is executed for the data file, the output of the leftmost icon is transferred to the function of the second icon counted from the left (FIGS. 6(B) to 6(C)). The function of the second icon is executed for the output and the output of the second icon is transferred to the function of the final icon of those function icons (FIG. 6(C) to 6(D)). When the function of the final icon is executed for the output of the second icon, final data is obtained (FIG. 6(D)). When the final data is obtained, a box representative of the result is displayed (FIG. 6(E)). By clicking the result box, final data is displayed.

In the instance of FIGS. 6(A) to 6(E), the icons are arrayed from right to left. A flow of processings may be controlled in a similar way if the icons are arrayed from top to bottom. The same thing is true for a combination of two icon series; one icon series consists of icons arrayed from right to left and the other consists of icons arrayed from top to bottom.

FIG. 30 shows a pictorial diagram useful in explaining a case where an error occurs during the course of processing operation and hence the processing operation is interrupted. In this instance, first and second function objects are successfully executed (FIGS. 30(A) to 30(C)). During the execution of the third function object, an error occurs and an error box is displayed in the icon corresponding to the third function icon (FIG. 30(D)). By opening the error box, the contents of the error is displayed.

The execution of the function object will end in the form of an error in case where a function object cannot execute a data object: the function object cannot analyze the data format of the data object; the contents of the data object are unsatisfactory for the function object; the data of the data object is destroyed; and a right of accessing the data object is not assigned to the function object.

The contents of the data object are contained in the error box. When a user double clicks the error box, a window corresponding to the error box is opened. The user can confirm the contents of the error box. A message describing the cause of the error is also displayed in the window.

FIG. 31 shows a flow of processing an error. An alteration or substitution of an object to be processed, and a continuation of the execution of the object are performed for the error. In FIG. 31, like portions to those in FIG. 27 are designated by like reference numerals, and the detailed description on them will be omitted for simplicity.

In FIG. 31, it is checked whether or not the execution of each function object normally end (S1130). If the execution of the function object normally ends, the next function object is used as a function object to next be executed, and the result data object is used as an input object of the next function object (S1131, S1132). The object is executed in the step S1104.

If the execution of the function object abnormally ends, an error box is generated, the input object is put in the error box, and the error box is displayed (S1133 to S1135). A user performs an alteration, deletion, addition or the like of the object in the error box, and gives an instruction of continuing the execution (S1136 and S1137) to the machine. In response to the instruction, the object in the error box is used as an input object, and the function of the object is executed (S1138).

As seen from the foregoing description, in the embodiment mentioned above, programs may be combined by using function objects, as they are, which are used in an operational environment. Therefore, functions that are consecutively executed in the operational environment are gathered and executed in a batch-processing manner. In composing a program, a scheme of the program is designed, and the designed scheme is implemented by the programming technique. In designing the program scheme, the following steps are taken: 1) consecutive activities are selectively picked up, 2) all events that can happen in the picked-up activities are understood, and measures for the events are determined, and 3) the events and the measures are described in a program language. The programming support apparatus and method of the present invention extremely simplifies the steps (1) and (2) above in the process of designing the program scheme.

Further, if an error occurs, an error box is displayed to enable a user to correct input data. Therefore, if the work in the step (2) is unsatisfactory, the user can easily cope with such an unsatisfactory work. Particularly, when a process to be performed one time only, an ambiguous process, and a process the whole of which cannot be comprehended is carried out, a program is formed as a temporary measure. If an error occurs later, a user deals with the error by using the error box.

Further, in the invention, the program execution may be triggered at the middle of a program. This is very convenient when only a part of a program is used. When an error occurs, a given process is carried out and then a program may be triggered at the middle of the program.

Furthermore, a flow of program, viz., which of the functions is to next be executed, can be changed when the function object is executed. Therefore, the user can deal with changes of a state during the course of carrying out a process.

Figure 32:
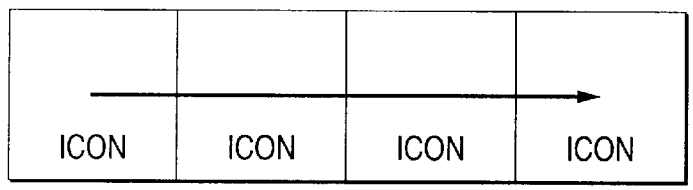
Figure 32:
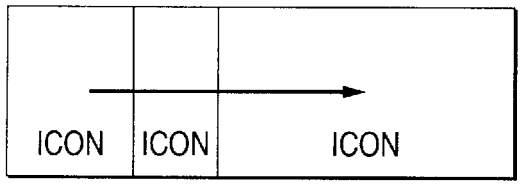
Figure 32:
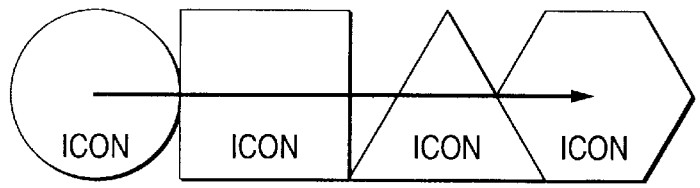
Figure 32:
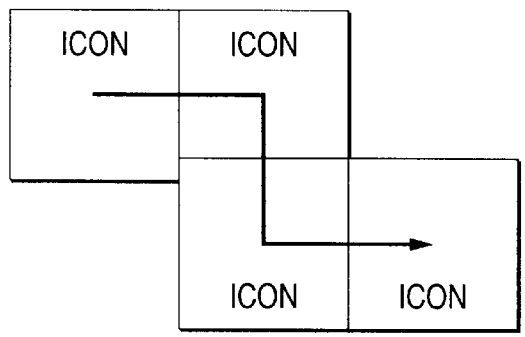
Figure 32:
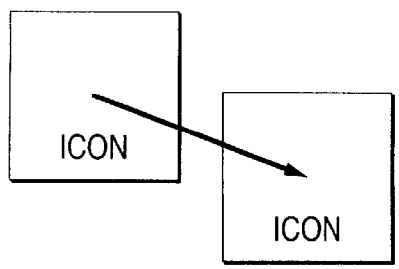

It should be understood that the present invention is not limited to the above-mentioned embodiments, but may variously be changed, modified and altered within the scope of the invention. For example, in determining an order of executing a series of icons on the basis of layout information of icons, square icons may be arrayed from left to right as shown in FIG. 32(A). The object may be rectangular in shape as shown in FIG. 32(B). The objects may take various shapes or those objects of various shapes may be combined as shown in FIG. 32(C). One flow may have two directions, one direction from left to right and the other direction from up to down as shown in FIG. 32(D). Even if two icons is not adjoining, but if they are adjacent to each other within a predetermined distance, they may be successively executed as shown in FIG. 32(E). In FIG. 32, each of arrows indicates an order of executing the icons and are not practically displayed.

An order of executing icons may be set by connecting icons, as shown in FIGS. 33(A) and 33(B).

As shown in FIG. 34, a mode to set an order of executing icons may be provided in the machine, and in the mode, icons may be clicked in a desired order, to set up an order of executing icons. After the icon executing order is set up, the machine is placed to a normal operation mode.

A modification of the embodiment is shown in FIG. 35. In the modification, designation is made for every function object unit, not program unit, whereby the operations of FIGS. 27 and 28 are replaced with one operation. The operation of the FIG. 35 modification is as follows:

Step S1140 : An object to be processed is designated. The icon of a data file, for example, is dragged.

Step S1141 : A function to be an execution start point is designated. The function of the icon of a data file, for example, is dragged to and dropped in the icon of a function to be an execution start point.

Step S1142 : The function of the start point is registered as the function to next be executed.

Step S1143 : The function to next be executed is sought and registered.

Step S1144 : It is checked as to whether or not the function to next be executed is present.

Step S1145 : After the functions of all the objects to be executed are registered, the registered functions are successively executed.

As described above, according to the present invention, by juxtaposing icons corresponding to objects, a user can simultaneously specify a function to be executed and set an order of executing functions. In this respect, the operability is improved. Further, in the invention, there is no need of displaying line segments to specify an execution order. Therefore, an expression of controls is explicit and handling becomes easy.

Further, a plural number of functions are successively executed in a batch-processing manner in an operational environment. A programming can be made by making full use of the individual functions in an operational environment.

What is claimed is:

1. A programming support apparatus, comprising:
   display means for displaying functions as display objects on a display screen area;
   judging means for recognizing a plurality of display objects, which are adjacent to each other directly or with a space in at least one direction, and for judging an arraying order of said plurality of display objects in said direction; and
   executing means for executing the functions corresponding to said plurality of display objects in the arraying order of said display objects.

2. A programming support apparatus according to claim 1, wherein one of said display objects is rectangular in shape.

3. A programming support apparatus according to claim 1, wherein when information to be processed is correlated with one of said display objects, said executing means executes a function corresponding to said correlated display object for the information to be processed.

4. A programming support apparatus according to claim 1, wherein said executing means generates a process for every information to be processed, and executes said functions in said arraying order in which said generated process is executed.

5. A programming support apparatus according to claim 1, wherein the function corresponding to at least one of said display objects contains the function to store information.

6. A programming support apparatus according to claim 1, wherein when one of said display objects is adjacent directly or with a space to other display objects arrayed upstream of said one of said display objects in a plural number of directions, said executing means executes the function corresponding to said one of said display object for outputs of the functions corresponding to said other display objects.

7. A programming support apparatus according to claim 1, wherein when one of said display object is adjacent directly or with a space to other display objects arrayed downstream of said one of said display object in a plural number of directions, said executing means executes at least one of the functions corresponding to said other display objects for an output of the function corresponding to said one of said display objects.

8. A programming support apparatus according to claim 7, wherein the functions corresponding to said other display objects are executed in their own orders for the output of the function corresponding to said one of said display objects, and after the execution of the preceding functions corresponding to said other display objects and the functions correlated thereto for said output is completed, the execution of the subsequent functions corresponding to said other display objects and the functions correlated thereto for said output starts.

9. A programming support apparatus according to claim 7, wherein the functions corresponding to said other display objects are correspondingly executed for a plural number of the outputs of the function corresponding to said one of said display objects, respectively.

10. A programming support apparatus according to claim 7, wherein the function corresponding to said one of said display objects outputs memory location data to specify a memory location where information to be processed is stored, and the functions corresponding to said other display objects are executed for the information stored in said memory location in a predetermined order on the basis of said memory location data.

11. A programming support apparatus according to claim 1, further comprising:
setting means for setting a trigger condition;
storage means for storing the trigger condition set by said setting means;
display means for displaying a trigger display object representative of the trigger condition; and
trigger control means operating for monitoring the trigger condition when an instruction to start monitoring of the trigger condition is issued, and for sending an instruction to execute a triggering process to said executing means when the trigger condition is satisfied.

12. A programming support apparatus according to claim 11, wherein when said trigger display object is located upstream of one of said display objects in a state that said trigger display object is adjacent directly or with a space to said one of said display objects in said at least one direction, and when the trigger condition corresponding to said trigger display object is satisfied, said trigger control means sends an instruction to trigger the function corresponding to said one of said display objects to said executing means.

13. A programming support apparatus according to claim 11, wherein when said trigger display object is adjacent directly or with a space to two display objects in said at least one direction, and when the trigger condition corresponding to said trigger display object is satisfied, said trigger control means sends to said executing means an instruction to input an output of the function corresponding to the upstream display object into the function corresponding to the downstream display object.

14. A programming support apparatus according to claim 11, wherein said trigger control means stores an environment condition when an instruction to start the monitoring of a trigger condition is issued, and after an event to alter the environment condition occurs, said trigger control means monitors said trigger condition only when an environment condition at the time of execution satisfies said stored environment condition, and sends said instruction to said executing means.

15. A programming support apparatus according to claim 11, further comprising:
means for specifying two functions to be successively executed;
means for displaying line segments for said two functions to be successively executed; and
means for specifying an execution start time difference for each of said line segments;
wherein said trigger control means sends said instruction in accordance with the time difference.

16. A programming support apparatus according to claim 11, wherein between a first display object and a second display object, said display objects are sequently arrayed in said at least one direction, while being adjacent to each other directly or with a space, and when the execution of the function related to at least one of said display objects fails to produce an expected result, said trigger control means sends to said executing means an instruction to execute the function related to a display object being adjacent directly to said first display object while being located downstream of said first display object.

17. A programming support apparatus according to claim 11, further comprising means for displaying information to be processed as a display object, wherein when said trigger display object is adjacent directly or with a space to an upstream display object of information to be processed and a downstream display object of the function in said at least one direction, and when the trigger condition corresponding to said trigger display object is satisfied, said trigger control means sends to said executing means an instruction to input said information to be processed to said function.

18. A programming support method, comprising the steps of:
displaying functions as display objects on a display screen area;
recognizing a plurality of display objects, which are adjacent to each other directly or with a space in at least one direction, and judging an arraying order of said plurality of display objects in said at least one direction; and
executing the functions corresponding to said plurality of display objects in the arraying order of said display objects.

19. A computer-readable medium encoded with a programming support program, said medium causing a computer to execute the following steps of:

displaying functions as display objects on a display screen area;

recognizing a plurality of display objects, which are adjacent to each other directly or with a space in at least one direction, and judging an arraying order of said plurality of display objects in said at least one direction; and executing the functions corresponding to said plurality of display objects in the arraying order of said display objects.

20. An information processing apparatus, comprising:

display means for displaying functions as display objects on a display screen area;

judging means for recognizing a plurality of display objects, which are adjacent to each other directly or with a space in at least one direction, and for judging an arraying order of said plurality of display objects in said one direction; and executing means for executing the functions corresponding to said plurality of display objects in the arraying order of said display objects.

21. A programming support apparatus, comprising:

display means for displaying functions and data as display objects on a display screen area;

means for executing, in response to a first operation done to said display objects on the display screen, corresponding functions and for displaying corresponding data;

first means for doing a second operation to a plurality of display objects corresponding to a plurality of functions on said display screen, to move the display objects adjacent to each other directly or with a space in at least one direction, to thereby specify an order to execute said plurality of functions;

second means for specifying, in response to a third operation done to said display objects on said display screen area, data to be executed of said plurality of functions; and executing means for successively executing said plurality of functions for said specified data in said specified executing order.

22. A programming support apparatus according to claim 21, wherein said executing means determines a function to next be executed when or after one function is executed.

23. A programming support apparatus according to claim 21, wherein said executing means displays an error on said display screen area in connection with a display object corresponding to a function suffering from an error.

24. A programming support apparatus according to claim 21, wherein in response to a fourth operation done to said error display on said display screen area, data to be processed by the function suffering from an error is displayed.

25. A programming support apparatus according to claim 21, wherein data displayed in response to said fourth operation is edited.

26. A programming support apparatus, comprising:

display means for displaying functions and data as display objects on a display screen area;

means for executing, in response to a first operation done to said display objects on the display screen area, corresponding functions and for displaying corresponding data;

first means for doing a second operation to a plurality of display objects corresponding to a plurality of functions on said display screen area, to move the display objects adjacent to each other directly or with a space in at least one direction, to thereby specify an order to execute said plurality of functions;

second means for specifying one of said display objects corresponding to said plurality of functions as an execution start point; and executing means for executing, in said execution order, the function corresponding to the display object designated as said start point and the functions located downstream in said execution order.

27. A programming support apparatus according to claim 26, wherein said executing means determines a function to next be executed when or after one function is executed.

28. A programming support apparatus according to claim 26, wherein said executing means displays an error on said display screen area in connection with a display object corresponding to a function suffering from an error.

29. A programming support apparatus according to claim 22, wherein in response to a fourth operation done to said error display on said display screen area, data to be processed by the function suffering from an error is displayed.

30. A programming support apparatus according to claim 26, wherein data displayed in response to said fourth operation is edited.

31. A programming support method, comprising the steps of:

displaying functions and data as display objects on a display screen area;

executing, in response to a first operation done to said display objects on the display screen area, corresponding functions and for displaying corresponding data;

doing a second operation to a plurality of display objects corresponding to a plurality of functions on said display screen area, to move the display objects adjacent to each other directly or with a space in at least one direction, to thereby specify an order to execute said plurality of functions;

specifying, in response to a third operation done to said display objects on said display screen area, data to be executed of said plurality of functions; and successively executing said plurality of functions for said specified data in said specified executing order.

32. A computer-readable medium encoded with a programming support program, said medium causing a computer to execute the following steps of:

displaying functions and data as display objects on a display screen area;

executing, in response to a first operation done to said display objects on the display screen area, corresponding functions and for displaying corresponding data;

doing a second operation to a plurality of display objects corresponding to a plurality of functions on said display screen area, to move the display objects adjacent to each other directly or with a space in at least one direction, to thereby specify an order to execute said plurality of functions;

specifying, in response to a third operation done to said display objects on said display screen area, data to be executed of said plurality of functions; and successively executing said plurality of functions for said specified data in said specified executing order.

33. An information processing apparatus, comprising:

display means for displaying functions and data as display objects on a display screen area;

means for executing, in response to a first operation done to said display objects on the display screen, corresponding functions and for displaying corresponding data;

first means for doing a second operation to a plurality of display objects corresponding to a plurality of functions on said display screen, to move the display objects adjacent to each other directly or with a space in at least one direction, to thereby specify an order to execute said plurality of functions;

second means for specifying, in response to a third operation done to said display objects on said display screen area, data to be executed of said plurality of functions; and executing means for successively executing said plurality of functions for said specified data in said specified executing order.

* * * * *